US012603094B2

(12) United States Patent
Riedmiller et al.

(10) Patent No.: US 12,603,094 B2
(45) **Date of Patent: *Apr. 14, 2026**

(54) ADAPTIVE PROCESSING WITH MULTIPLE MEDIA PROCESSING NODES

(71) Applicant: DOLBY LABORATORIES LICENSING CORPORATION, San Francisco, CA (US)

(72) Inventors: Jeffrey Riedmiller, Penngrove, CA (US); Regunathan Radhakrishnan, Foster City, CA (US); Marvin Pribadi, Redwood City, CA (US); Farhad Farahani, Los Altos, CA (US); Michael Smithers, Kareela (AU)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 19 days.

This patent is subject to a terminal disclaimer.

(21) Appl. No.: 18/674,333

(22) Filed: May 24, 2024

(65) Prior Publication Data

US 2025/0069607 A1 Feb. 27, 2025

Related U.S. Application Data

(63) Continuation of application No. 17/202,150, filed on Mar. 15, 2021, now abandoned, which is a
(Continued)

(51) Int. Cl.
*G06F 17/00* (2019.01)
*G10L 19/008* (2013.01)
(Continued)

(52) U.S. Cl.
CPC .......... *G10L 19/008* (2013.01); *G10L 19/167* (2013.01); *G10L 21/00* (2013.01)

(58) Field of Classification Search
CPC ...... G10L 19/008; G10L 19/167; G10L 21/00
(Continued)

(56) References Cited

U.S. PATENT DOCUMENTS 5,744,742 A 4/1998 Lindemann
5,794,185 A 8/1998 Bergstrom
(Continued)

FOREIGN PATENT DOCUMENTS

CA 2176983 C 4/2000
CN 1130449 9/1996
(Continued)

OTHER PUBLICATIONS

ID3 draft specification; available at least 2000 (Year: 2000).*
(Continued)

*Primary Examiner* — Paul C McCord

(57) ABSTRACT

Techniques for adaptive processing of media data based on separate data specifying a state of the media data are provided. A device in a media processing chain may determine whether a type of media processing has already been performed on an input version of media data. If so, the device may adapt its processing of the media data to disable performing the type of media processing. If not, the device performs the type of media processing. The device may create a state of the media data specifying the type of media processing. The device may communicate the state of the media data and an output version of the media data to a recipient device in the media processing chain, for the purpose of supporting the recipient device's adaptive processing of the media data.

3 Claims, 17 Drawing Sheets

Related U.S. Application Data continuation of application No. 15/808,676, filed on Nov. 9, 2017, now abandoned, which is a continuation of application No. 13/989,256, filed as application No. PCT/US2011/062828 on Dec. 1, 2011, now Pat. No. 9,842,596.

(60) Provisional application No. 61/558,286, filed on Nov. 10, 2011, provisional application No. 61/419,747, filed on Dec. 3, 2010.

(51) Int. Cl.
*G10L 19/16* (2013.01)
*G10L 21/00* (2013.01)

(58) Field of Classification Search
USPC .......................................... 704/500; 700/94
See application file for complete search history.

(56) References Cited

U.S. PATENT DOCUMENTS

| | | | |
|---|---|---|---|
| 5,903,862 | A | 5/1999 | Weaver, Jr. |
| 5,949,891 | A | 9/1999 | Wagner |
| 6,611,607 | B1 | 8/2003 | Davis |
| 7,055,034 | B1 | 5/2006 | Levy |
| 7,072,477 | B1 | 7/2006 | Kincaid |
| 7,251,343 | B2 | 7/2007 | Dorrell |
| 7,272,235 | B2 | 9/2007 | Lu |
| 7,318,023 | B2 | 1/2008 | Baum |
| 7,369,906 | B2 | 5/2008 | Frindle |
| 7,412,380 | B1 | 8/2008 | Avendano |
| 7,444,336 | B2 | 10/2008 | Karaogus |
| 7,631,319 | B2 | 12/2009 | Miller |
| 7,653,265 | B2 | 1/2010 | Ruggiero |
| 7,729,673 | B2 | 6/2010 | Romesburg |
| 7,770,228 | B2 | 8/2010 | Carpentier |
| 7,877,752 | B2 | 1/2011 | Neuman |
| 8,315,396 | B2 | 11/2012 | Schreiner |
| 8,489,774 | B2 | 7/2013 | Shah |
| 8,521,314 | B2 | 8/2013 | Seefeldt |
| 8,594,392 | B2 | 11/2013 | Bilobrov |
| 8,688,248 | B2 | 4/2014 | Wang |
| 8,725,829 | B2 | 5/2014 | Wang |
| 8,781,820 | B2 | 7/2014 | Seguin |
| 8,812,498 | B2 | 8/2014 | Ingrassia, Jr. |
| 8,903,098 | B2 | 12/2014 | Tsuji |
| 8,908,874 | B2 | 12/2014 | Johnston |
| 8,965,774 | B2 | 2/2015 | Eppolito |
| 8,989,884 | B2 | 3/2015 | Guetta |
| 9,240,763 | B2 | 1/2016 | Baumgarte |
| 9,294,062 | B2 | 3/2016 | Hatanaka |
| 9,300,268 | B2 | 3/2016 | Chen |
| 9,542,952 | B2 | 1/2017 | Hatanaka |
| 9,576,585 | B2 | 2/2017 | Bleidt |
| 9,608,588 | B2 | 3/2017 | Baumgarte |
| 9,633,663 | B2 | 4/2017 | Heuberger |
| 9,830,915 | B2 | 11/2017 | Schreiner |
| 9,836,272 | B2 | 12/2017 | Kono |
| 9,842,596 | B2 * | 12/2017 | Riedmiller .............. G10L 19/26 |
| 2002/0001395 | A1 | 1/2002 | Davis |
| 2002/0032502 | A1 | 3/2002 | Russell |
| 2002/0156633 | A1 | 10/2002 | Hickey |
| 2003/0016755 | A1 | 1/2003 | Tahara |
| 2003/0039365 | A1 | 2/2003 | Eid |
| 2003/0103645 | A1 | 6/2003 | Levy |
| 2003/0138127 | A1 | 7/2003 | Miller |
| 2004/0028244 | A1 | 2/2004 | Tsushima |
| 2004/0237750 | A1 | 12/2004 | Smith |
| 2004/0267778 | A1 | 12/2004 | Rudolph |
| 2005/0075860 | A1 | 4/2005 | Takeishi |
| 2005/0081243 | A1 | 4/2005 | Barrett |
| 2005/0144006 | A1 | 6/2005 | Oh |
| 2005/0165779 | A1 | 7/2005 | Kaiser |
| 2005/0240395 | A1 | 10/2005 | Wiser |
| 2005/0286696 | A1 | 12/2005 | Bathurst |
| 2006/0002572 | A1 | 1/2006 | Smithers et al. |
| 2006/0013077 | A1 | 1/2006 | Mesarovic |
| 2006/0115094 | A1 | 6/2006 | Abe |
| 2006/0259781 | A1 | 11/2006 | Saeki |
| 2007/0088957 | A1 | 4/2007 | Carson |
| 2007/0105631 | A1 | 5/2007 | Herr |
| 2007/0112565 | A1 | 5/2007 | Kim |
| 2007/0168197 | A1 | 7/2007 | Vasilache |
| 2007/0244962 | A1 | 10/2007 | Laadan |
| 2007/0266252 | A1 | 11/2007 | Davis |
| 2007/0291959 | A1 | 12/2007 | Seefeldt |
| 2007/0299657 | A1 | 12/2007 | Kang |
| 2008/0007649 | A1 | 1/2008 | Bennett |
| 2008/0025530 | A1 | 1/2008 | Romesburg |
| 2008/0031463 | A1 | 2/2008 | Davis |
| 2008/0031535 | A1 | 2/2008 | Shi |
| 2008/0040102 | A1 | 2/2008 | Beerends |
| 2008/0080722 | A1 | 4/2008 | Carroll |
| 2008/0098027 | A1 | 4/2008 | Aarts |
| 2008/0208891 | A1 | 8/2008 | Wang |
| 2008/0255689 | A1 | 10/2008 | Nagayama |
| 2008/0288263 | A1 | 11/2008 | Jung |
| 2009/0034744 | A1 | 2/2009 | Van Loon |
| 2009/0063159 | A1 | 3/2009 | Crockett |
| 2009/0079842 | A1 | 3/2009 | Wilson |
| 2009/0097676 | A1 | 4/2009 | Seefeldt |
| 2009/0112607 | A1 | 4/2009 | Ashley |
| 2009/0161017 | A1 | 6/2009 | Glen |
| 2009/0259477 | A1 | 10/2009 | Ashley |
| 2009/0299756 | A1 | 12/2009 | Davis |
| 2009/0299823 | A1 | 12/2009 | Nagasaka |
| 2010/0014692 | A1 | 1/2010 | Schreiner |
| 2010/0020954 | A1 | 1/2010 | Gilg |
| 2010/0036966 | A1 | 2/2010 | Munetsugu |
| 2010/0037059 | A1 | 2/2010 | Sun |
| 2010/0106270 | A1 | 4/2010 | Oh |
| 2010/0135507 | A1 | 6/2010 | Kino |
| 2010/0169087 | A1 | 7/2010 | Ashley |
| 2010/0260354 | A1 | 10/2010 | Ozawa |
| 2010/0281178 | A1 | 11/2010 | Sullivan |
| 2010/0322446 | A1 | 12/2010 | Strahl |
| 2011/0002266 | A1 | 1/2011 | Gao |
| 2011/0182432 | A1 | 7/2011 | Ishikawa |
| 2011/0182438 | A1 | 7/2011 | Koike |
| 2012/0014540 | A1 | 1/2012 | Lu |
| 2012/0131325 | A1 | 5/2012 | Sato |
| 2012/0275625 | A1 | 11/2012 | Kono |
| 2012/0314876 | A1 | 12/2012 | Vilkamo |
| 2013/0094669 | A1 | 4/2013 | Kono |
| 2016/0225376 | A1 | 8/2016 | Honma |
| 2016/0315722 | A1 | 10/2016 | Holman |
| 2016/0351202 | A1 | 12/2016 | Baumgarte |
| 2017/0092280 | A1 | 3/2017 | Hirabayashi |
| 2017/0223429 | A1 | 8/2017 | Schreiner |

FOREIGN PATENT DOCUMENTS

| | | |
|---|---|---|
| CN | 1131994 | 9/1996 |
| CN | 1179225 | 4/1998 |
| CN | 1212580 | 3/1999 |
| CN | 1604186 | 4/2005 |
| CN | 1679082 | 10/2005 |
| CN | 1973434 | 5/2007 |
| CN | 101065945 | 10/2007 |
| CN | 101098478 | 1/2008 |
| CN | 101127212 A | 2/2008 |
| CN | 101127213 A | 2/2008 |
| CN | 101160616 | 4/2008 |
| CN | 101208872 A | 6/2008 |
| CN | 101355555 | 1/2009 |
| CN | 101517637 B | 8/2009 |
| CN | 101527829 | 9/2009 |
| CN | 101617361 | 12/2009 |
| CN | 101828386 | 9/2010 |
| CN | 102131023 | 7/2011 |
| CN | 101189660 B | 7/2012 |
| CN | 101171636 B | 5/2014 |
| CN | 111613233 A | 9/2020 |

(56) References Cited

FOREIGN PATENT DOCUMENTS

| | | | |
|---|---|---|---|
| CN | 112002334 | A | 11/2020 |
| CN | 112002335 | A | 11/2020 |
| CN | 112002336 | A | 11/2020 |
| EP | 1878010 | | 1/2008 |
| EP | 1959431 | B1 | 6/2010 |
| EP | 2214308 | A1 | 8/2010 |
| EP | 2360683 | | 8/2011 |
| EP | 1587063 | B1 | 10/2011 |
| EP | 3089161 | | 11/2016 |
| FR | 2899408 | B1 | 7/2008 |
| JP | H06-186999 | | 7/1994 |
| JP | 2002203386 | A | 7/2002 |
| JP | 2002-539487 | | 11/2002 |
| JP | 2008-505586 | | 2/2008 |
| JP | 2008505586 | A | 2/2008 |
| JP | 2008-529056 | | 7/2008 |
| JP | 2008197199 | | 8/2008 |
| JP | 2008-536193 | | 9/2008 |
| JP | 2009-080485 | | 4/2009 |
| JP | 2009-244912 | | 10/2009 |
| JP | 2011186187 | | 9/2011 |
| JP | 5166241 | | 3/2013 |
| JP | 2014505898 | A | 3/2014 |
| JP | 7012786 | B2 | 1/2022 |
| KR | 10-2018-0100257 | A | 9/2018 |
| KR | 20180100257 | A | 9/2018 |
| KR | 10-1943295 | | 4/2019 |
| KR | 101943295 | B1 | 4/2019 |
| KR | 10-2043609 | | 11/2019 |
| KR | 102043609 | B1 | 11/2019 |
| KR | 102155491 | B1 | 11/2019 |
| KR | 102383651 | B1 | 7/2021 |
| RU | 2374703 | C2 | 11/2009 |
| RU | 2384014 | C2 | 3/2010 |
| RU | 2009116276 | A | 11/2010 |
| RU | 2418322 | | 5/2011 |
| RU | 2420814 | | 6/2011 |
| WO | 2000054453 | A1 | 9/2000 |
| WO | 2006110975 | A1 | 10/2006 |
| WO | 2006113047 | A1 | 10/2006 |
| WO | 2007120453 | A1 | 10/2007 |
| WO | 2009/031870 | | 3/2009 |
| WO | 2010033384 | A1 | 3/2010 |
| WO | 2010/053728 | | 5/2010 |
| WO | 2010/148239 | | 12/2010 |
| WO | 2011131732 | | 10/2011 |
| WO | 2014111290 | | 7/2014 |
| WO | 2014160849 | | 10/2014 |
| WO | 2014160895 | | 10/2014 |
| WO | 2015059087 | | 4/2015 |
| WO | 2015088697 | | 6/2015 |
| WO | 2015144587 | | 10/2015 |
| WO | 2015148046 | | 10/2015 |
| WO | 2016075053 | | 5/2016 |
| WO | 2016193033 | | 12/2016 |
| WO | 2016202682 | | 12/2016 |
| WO | 2017023423 | | 2/2017 |
| WO | 2017023601 | | 2/2017 |
| WO | 2017058731 | | 4/2017 |
| WO | 2016002738 | | 5/2017 |

OTHER PUBLICATIONS

Advanced Television Systems Committee, Inc, "ATSC Recommended Practice: Techniques for Establishing and Maintaining Audio Loudness for Digital Television", Document A/85:2009, Washington D.C., published Nov. 4, 2009.

ATSC Digital Audio Compression Standard (AC-3, E-AC-3) Revision B, Jun. 24, 2005.

Camerer: Loudness Nirvana (Year: 2010).

Cano, P. et al "A Review of Algorithms for Audio Fingerprinting" IEEE Workshop on Multimedia Signal Processing, Dec. 9-11, 2002, pp. 169-173.

Cossette, S.G. et al. "New Techniques for Audio Metadata Use and Distribution", Proceeding of the Audio Engineering Convention Society, AES 117th, vol. 117, Sep. 24, 1999, pp. 1-11.

EBU R128 (Year: 2010).

EBU-Tech Specification of the Broadcast Wave Format, A Format for Audi Data Files, Published Oct. 2009.

Fielder, L. D., et al "Introduction to Dolby Digital Plus, an Enhancement to the Dolby Digital Coding System" AES presented at the 117th Convention, San Francisco, CA USA, Oct. 28-31, 2004, pp. 1-30.

Gehani, A. et al "VEIL: A System for Certifying Video Provenance" Ninth IEEE International Symposium on Multimedia, Piscataway, NJ, USA, Dec. 1, 2007, pp. 263-272.

Grimm: Determining Optimal Gated Loudness (Year: 2010).

Grimm: Improvement of ITU Loudness (Year: 2010).

ITU BS. 1770-2 (Year: 2011).

Kudumakis—107th MPEG San Jose (CA), USA, Jan. 13-17, 2014, Meeting Report Panos Kudumakis qMedia, Queen Mary University of London (7 pgs.).

Kudumakis—108th MPEG Valencia, Spain, Mar. 31-Apr. 4, 2014, Meeting Report Panos Kudumakis qMedia, Queen Mary University of London (9 pgs.).

Nilsson, M. ID3 Tag Version 2, Informal Standard, 1998.

Robinson, C. et al "Dynamic Range Control via Metadata" Audio Engineering Society, presented at the 107th Convention, Sep. 1999, pp. 1-14.

Schildbach, W. et al. "Transcoding of Dynamic Range Control Coefficients and Other Metadata into MPEG-4 HE AAC", AES Convention 123, Oct. 1, 2007, p. 2.

Skovenborg, E. et al "Loudness Descriptors to Characterize Wide Loudness-Range Material" AES Convention Oct. 2009.

Wikipedia Loudness Normalization page downloaded from Archive.org and available at least Apr. 2010 (Year: 2010).

Wikipedia Replay Gain page downloaded from Archive.org and available at least Apr. 2010 (Year: 2010).

Wu, F., et al., Digital Audio Frequency, Principle and Application of Multi-Channel Audio Compression Coding, p. 1-31.

* cited by examiner

ADAPTIVE PROCESSING WITH MULTIPLE MEDIA PROCESSING NODES

CROSS-REFERENCE TO RELATED APPLICATION AND PRIORITY CLAIM

This application is a continuation of U.S. patent application Ser. No. 17/202,150 filed Mar. 15, 2021, which is a continuation of U.S. patent application Ser. No. 15/808,676 filed Nov. 9, 2017, which is a continuation of U.S. patent application Ser. No. 13/989,256 filed May 23, 2013, now U.S. Pat. No. 9,842,596 issued Dec. 12, 2017, which is the 371-national stage of PCT Application No. PCT/US2011/062828 filed Dec. 1, 2011, which claims priority to U.S. Provisional Application No. 61/419,747, filed on Dec. 3, 2010 and U.S. Provisional Application No. 61/558,286, filed on Nov. 10, 2011, all of which are hereby incorporated by reference in entirety for all purposes.

TECHNOLOGY

The present invention relates generally to media processing systems, and in particular, to adaptively processing media data based on media processing states of the media data.

BACKGROUND

Media processing units typically operate in a blind fashion and do not pay attention to the processing history of media data that occurs before the media data is received. This may work in a media processing framework in which a single entity does all the media processing and encoding for a variety of target media rendering devices while a target media rendering device does all the decoding and rendering of the encoded media data. However, this blind processing does not work well (or at all) in situations where a plurality of media processing units are scattered across a diverse network or are placed in tandem (i.e. chain) and are expected to optimally perform their respective types of media processing. For example, some media data may be encoded for high performance media systems and may have to be converted to a reduced form suitable for a mobile device along a media processing chain. Accordingly, a media processing unit may unnecessarily perform a type of processing on the media data that has already been performed. For instance, a volume leveling unit performs processing on an input audio clip, irrespective of whether or not volume leveling has been previously performed on the input audio clip. As a result, the volume leveling unit performs leveling even when it is not necessary. This unnecessary processing may also cause degradation and/or the removal of specific features while rendering the media content in the media data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 12L-1 and FIG. 12L-2, illustrate block diagrams of some example media processing nodes/devices, according to some embodiments of the present invention.

DESCRIPTION OF EXAMPLE POSSIBLE EMBODIMENTS

Figure 1:
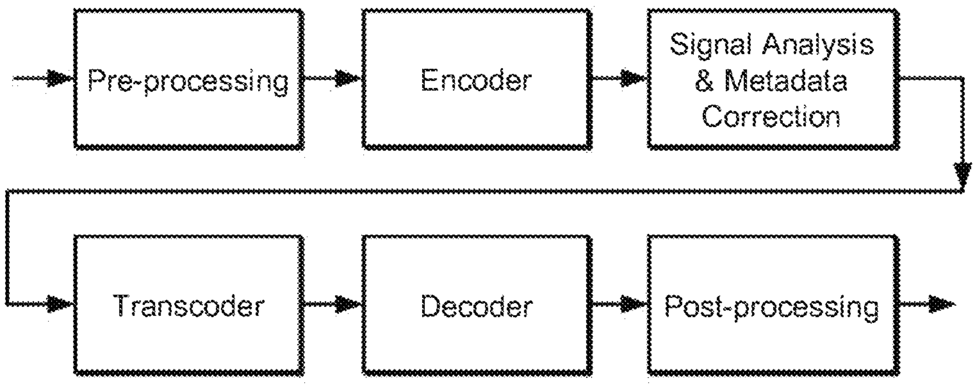
FIG. 1 illustrates an example media processing chain in accordance with some possible embodiments of the present invention.

Example possible embodiments, which relate to adaptive processing of media data based on media processing states of the media data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEDIA PROCESSING CHAINS
3. MEDIA PROCESSING DEVICES OR UNITS
4. EXAMPLE ADAPTIVE PROCESSING OF MEDIA DATA
5. DATA HIDING
6. EXAMPLE PROCESS FLOW

7. IMPLEMENTATION MECHANISMS—HARDWARE OVER VIEW
8. ENUMERATED EXAMPLE EMBODIMENTS
9. EQUIVALENTS, EXTENSIONS, ALTERNATIVES AND MISCELLANEOUS

1. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Techniques for adaptive processing of media data based on media processing states of the media data are described. In some possible embodiments, media processing units in an enhanced media processing chain are automatically enabled to retrieve and validate media processing signaling and/or processing state metadata, determine the state of media data based on the media processing signaling and/or processing state metadata, adapt their respective processing based on the state of the media data. The media processing units in the enhanced media processing chain may include, but are not limited to encoders, transcoders, decoders, pre-processing units, post-processing units, bitstream processing tools, Advanced Television Systems Committee (ATSC) codecs, Moving Picture Experts Group (MPEG) codecs, etc. A media processing unit may be a media processing system or a part of a media processing system.

As used herein, the term “processing state metadata” refers to separate and different data from media data, while the media data (e.g., video frames, perceptually coded audio frames or PCM audio samples containing media content) refers to media sample data that represents media content and is used to render the media content as audio or video output. The processing state metadata is associated with the media data and specifies what types of processing that have already been performed on the media data. This association of the processing state metadata with the media data is time-synchronous. Thus, the present processing state metadata indicates that the present media data contemporaneously comprises the results of the indicated types of media processing and/or a description of media features in the media data. In some possible embodiments, processing state metadata may include processing history and/or some, or all, of the parameters that are used in and/or derived from the indicated types of media processing. Additionally and/or optionally, the processing state metadata may include media features of one or more different types computed/extracted from the media data. Media features as described herein provide a semantic description of the media data and may comprise one or more of structural properties, tonality including harmony and melody, timbre, rhythm, reference loudness, stereo mix, or a quantity of sound sources of the media data, absence or presence of voice, repetition characteristics, melody, harmonies, lyrics, timbre, perceptual features, digital media features, stereo parameters, voice recognition (e.g., what a speaker is saying), etc. The processing state metadata may also include other metadata that is not related to or derived from any processing of the media data. For example, third party data, tracking information, identifiers, proprietary or standard information, user annotation data, user preference data, etc. may be added by a particular media processing unit to pass on to other media processing units. These independent types of metadata may be distributed to or fro, validated and used by a media processing component in the media processing chain. The term “media processing signaling” refers to relatively lightweight control or status data (which may be of a small data volume relative to that of the processing state metadata) that are communicated between media processing units in a media bitstream. The media processing signaling may comprise a subset, or a summary, of processing state metadata.

Media processing signaling and/or processing state metadata may be embedded in one or more reserved fields (e.g., which may be, but are not limited to, currently unused), carried in a sub-stream in a media bitstream, hidden with media data, or provided with a separate media processing database. In some possible embodiments, the data volume of media processing signaling and/or processing state metadata may be small enough to be carried (e.g., in reserved fields, or hidden in media samples using reversible data hiding techniques, or storing detailed processing state information in an external database while computing media fingerprints from the media data or retrieving media fingerprints from the media data, etc.) without affecting the bit rate allocated to carry the media data. Communicating media processing signaling and/or processing state metadata in an enhanced media processing chain is particularly useful when two or more media processing units need to work in tandem with one another throughout the media processing chain (or content lifecycle). Without media processing signaling and/or processing state metadata, severe media processing problems such as quality, level and spatial degradations may likely occur, for example, when two or more audio codecs are utilized in the chain and single-ended volume leveling is applied more than once during media content’s journey to a media consuming device (or a rendering point of the media content in the media data).

In contrast, techniques herein elevate the intelligence of any or all of media processing units in an enhanced media processing chain (content lifecycle). Under the techniques herein, any of these media processing units can both “listen and adapt” as well as “announce” the state of the media data to downstream media processing units. Thus, under the techniques herein, a downstream media processing unit may optimize its processing of the media data based on the knowledge of past processing of the media data as performed by one or more upstream media processing units. Under the techniques herein, the media processing by the media processing chain as a whole on the media data becomes more efficient, more adaptive, and more predictable than otherwise. As a result, overall rendering and handling of the media content in the media data is much improved.

Importantly, under the techniques herein, the presence of the state of the media data as indicated by media processing signaling and/or processing state metadata does not negatively impact legacy media processing units that may be present in the enhanced media processing chain and may not themselves proactively use the state of the media data to adaptively process the media data. Furthermore, even if a legacy media processing unit in the media processing chain may have a tendency to tamper with the processing results of other upstream media processing devices, the processing state metadata herein may be safely and securely passed to downstream media processing devices through secure communication methods that make use of cryptographic values, encryption, authentication and data hiding. Examples of data hiding include both reversible and irreversible data hiding.

In some possible embodiments, in order to convey a state of media data to downstream media processing units, techniques herein wrap and/or embed one or more processing sub-units in the forms of software, hardware, or both, in a media processing unit to enable the media processing unit to read, write, and/or validate processing state metadata delivered with the media data.

In some possible embodiments, a media processing unit (e.g., encoder, decoder, leveler, etc.) may receive media data on which one or more types of media processing have been previously performed yet: 1) no processing state metadata exists to indicate these types of previously performed media processing, and/or 2) processing state metadata may be incorrect or incomplete. The types of media processing that were previously performed include operations (e.g., volume leveling) that may alter media samples as well as operations (e.g., fingerprint extraction and/or feature extractions based on media samples) that may not alter media samples. The media processing unit may be configured to automatically create "correct" processing state metadata reflecting the "true" state of the media data and associate this state of the media data with the media data by communicating the created processing state metadata to one or more downstream media processing units. Further, the association of the media data and the processing state metadata may be performed in such a way that a resulting media bitstream is backward compatible with legacy media processing units such as legacy decoders. As a result, legacy decoders that do not implement the techniques herein may still be able to decode the media data correctly as the legacy decoders are designed to do, while ignoring the associated processing state metadata that indicates the state of the media data. In some possible embodiments, the media processing unit herein may be concurrently configured with an ability to validate the processing state metadata with the (source) media data via forensic analysis and/or validation of one or more embedded hash values (e.g., signatures).

Under techniques as described herein, adaptive processing of the media data based on a contemporaneous state of the media data as indicated by the received processing state metadata may be performed at various points in a media processing chain. For instance, if loudness metadata in the processing state metadata is valid, then a volume leveling unit subsequent to a decoder may be notified by the decoder with media processing signaling and/or processing state metadata so that the volume leveling unit may pass the media data such as audio unchanged.

In some embodiments, processing state metadata includes media features extracted from underlying media samples. The media features may provide a semantic description of the media samples and may be provided as a part of the processing state metadata to indicate, for example, whether the media samples comprise speech, music, whether somebody is singing in silence or in noisy conditions, whether singing is over a talking crowd, whether a dialog is occurring, whether a speech over a noisy background, a combination of two or more the foregoing, etc. Adaptive processing of the media data may be performed at various points in a media processing chain based on the description of media features contained in the processing state metadata.

Under techniques as described herein, processing state metadata embedded in a media bitstream with media data may be authenticated and validated. For instance, the techniques herein may be useful for loudness regulatory entities to verify if a particular program's loudness is already within a specified range and that the media data itself has not been modified (thereby ensuring compliance with regulations). A loudness value included in a data block comprising the processing state metadata may be read out to verify this, instead of computing the loudness again.

Under techniques as described herein, a data block comprising processing state metadata may include additional reserved bytes for carrying 3rd party metadata securely. This feature may be used to enable a variety of applications. For instance, a rating agency (e.g., Nielsen Media Research) may choose to include a content identification tag which can then be used to identify a particular program being viewed or listened for the purpose of computing ratings, viewership or listenership statistics.

Significantly, techniques described herein, and variations of the techniques described herein, may ensure that processing state metadata associated with the media data is preserved throughout the media processing chain from content creation to content consumption.

In some possible embodiments, mechanisms as described herein form a part of a media processing system, including but not limited to a handheld device, game machine, television, laptop computer, netbook computer, cellular radiotelephone, electronic book reader, point of sale terminal, desktop computer, computer workstation, computer kiosk, and various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MEDIA PROCESSING CHAINS

FIG. 1 illustrates an example media processing chain in accordance with some possible embodiments of the present invention. The media processing chain may, but is not limited to, comprise encoders, decoders, pre/post-processing units, transcoders, and signal analysis & metadata correction units. These units in the media processing chain may be comprised in a same system or in different systems. In embodiments in which the media processing chain spans across multiple different systems, these systems may be co-located or geographically distributed.

In some possible embodiments, a pre-processing unit of FIG. 1 may accept PCM (time-domain) samples comprising media content as input and outputs processed PCM samples. An encoder may accept PCM samples as input and outputs an encoded (e.g., compressed) media bitstream of the media content.

As used herein, the data (e.g., carried in a main stream of the bitstream) comprising the media content is referred to as media data, while separate data from the media data that indicates types of processing performed on the media data at any given point in the media processing chain is referred to as processing state metadata.

A Signal Analysis and Metadata correction unit may accept one or more encoded media bitstreams as input and validate if the included processing state metadata in the encoded media bitstreams is correct by performing signal analysis. If the Signal Analysis and Metadata correction unit finds that the included metadata is invalid, the Signal Analysis and Metadata correction unit replaces the incorrect value with the correct value obtained from signal analysis. A transcoder may accept media bitstreams as input and outputs a modified media bitstream. A decoder may accept compressed media bitstreams as input and output a stream of decoded PCM samples. A post-processing unit may accept a stream of decoded PCM samples, perform any post processing such as volume leveling of the media content therein, and render the media content in the decoded PCM samples on one or more speakers and/or display panels. All of the media processing units may not be able to adapt their processing to be applied to the media data using processing state metadata.

Techniques as provided herein provide an enhanced media processing chain in which media processing units such as encoders, decoders, transcoders, pre- and post-processing units, etc. adapt their respective processing to be applied on media data according to a contemporaneous state of the media data as indicated by media processing signaling and/or processing state metadata respectively received by these media processing units.

Figure 2:
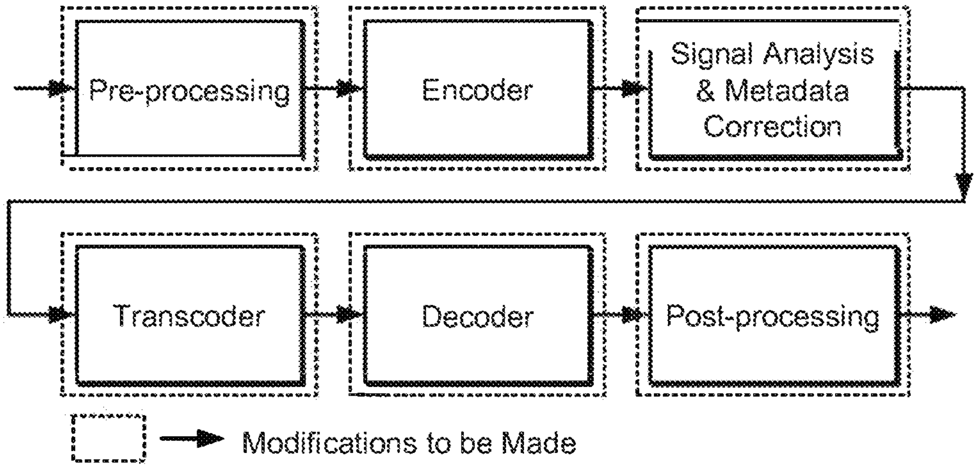
FIG. 2 illustrates an example enhanced media processing chain, in accordance with some possible embodiments of the present invention.

FIG. 2 illustrates an example enhanced media processing chain comprising encoders, decoders, pre/post-processing units, transcoders, and signal analysis & metadata correction units, in accordance with some possible embodiments of the present invention. In order to adapt processing the media data based on the state of the media data, some, or all, of the units of FIG. 2 may be modified. In some possible embodiments, each of the media processing units in the example enhanced media processing chain is configured to work cooperatively in performing non-redundant media processing and avoiding unnecessary and erroneous repetition of processing that has been performed by upstream units. In some possible embodiments, the state of the media data at any point of the enhanced media processing chain from content creation to content consumption is understood by a current media processing unit at that point of the enhanced media processing chain.

3. MEDIA PROCESSING DEVICES OR UNITS

Figure 3:
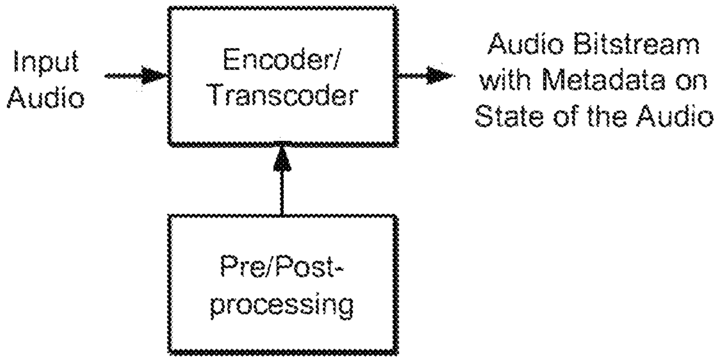
FIG. 3 illustrates an example encoder/transcoder, in accordance with some possible embodiments of the present invention.

FIG. 3 illustrates an example (modified) encoder/transcoder, in accordance with some possible embodiments of the present invention. Unlike encoders of FIG. 1, the encoder/transcoder of FIG. 3 may be configured to receive processing state metadata associated with input media data and to determine prior (pre/post-) processing, performed by one or more upstream units relative to the encoder/transcoder, on input media data (e.g., input audio) which the modified encoder/transcoder logically received from an upstream unit (e.g., the last upstream unit that has performed its processing on the input audio).

As used herein, the term "logically receive" may mean that an intermediate unit may or may not be involved in communicating the input media data from an upstream unit (e.g., the last upstream unit) to a recipient unit, such as the encoder/transcoder unit in the present example.

In an example, the upstream unit that performed the pre/post-processing on the input media data may be in a different system than the system in which the recipient unit is a part. The input media data may be a media bitstream outputted by the upstream unit and communicated through an intermediate transmission unit such as a network connection, a USB, a wide-area-network connection, a wireless connection, an optical connection, etc.

In another example, the upstream unit that performed the pre/post-processing on the input media data may be in the same system in which the recipient unit is a part. The input media data may be outputted by the upstream unit and communicated through an internal connection via one or more internal units of the system. For instance, the data may be physically delivered through an internal bus, a crossbar connection, a serial connection, etc. In any event, under techniques herein, the recipient unit may logically receive the input media data from the upstream unit.

Figure 11:
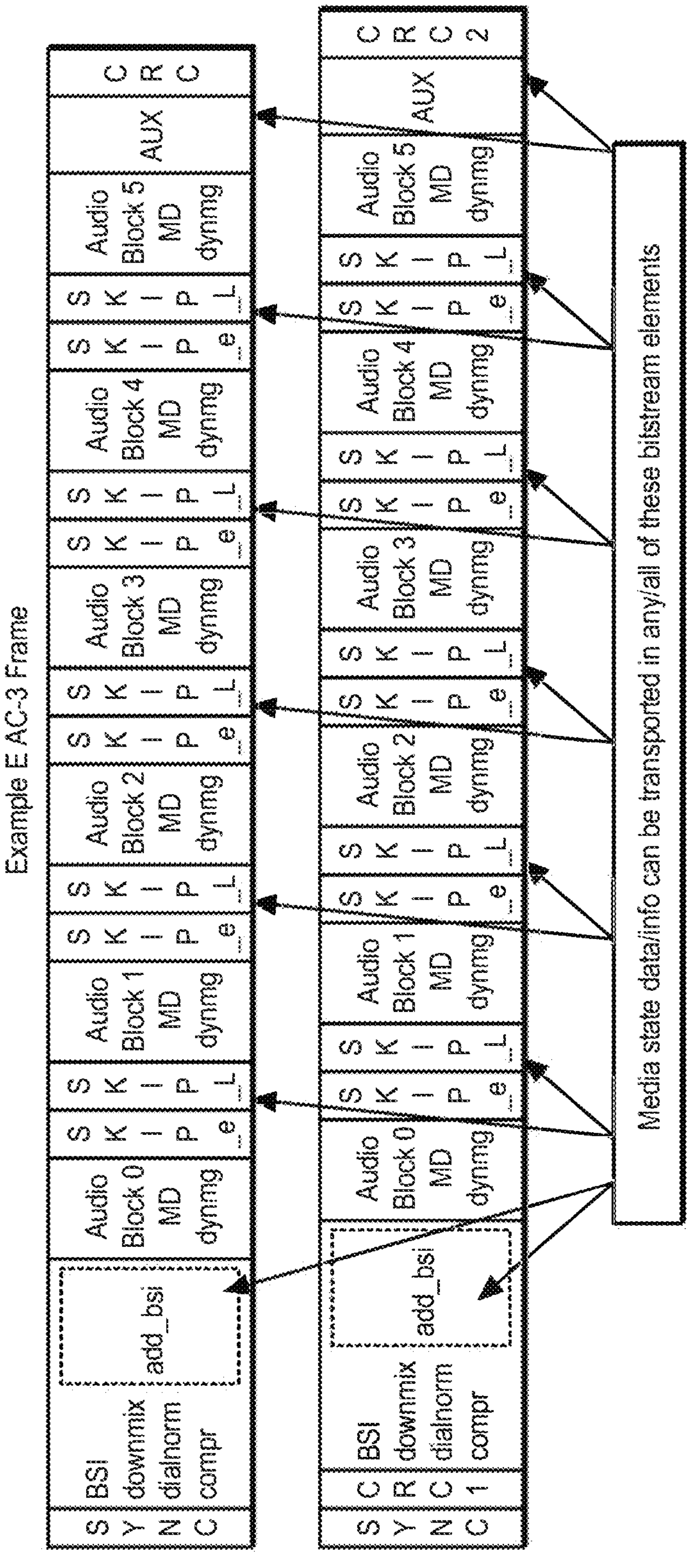
FIG. 11 illustrates media frames with which processing state metadata associated with media data in the media frames may be transmitted, according to an example embodiment.

In some possible embodiments, the encoder/transcoder is configured to create or modify processing state metadata associated with the media data, which may be a revision of the input media data. The new or modified processing state metadata created or modified by the encoder/transcoder may automatically and accurately capture the state of the media data that is to be outputted by the encoder/transcoder further along the media processing chain. For instance, the processing state metadata may include whether or not certain processing (e.g., Dolby Volume, Upmixing, commercially available from Dolby Laboratories) was performed on the media data. Additionally and/or optionally, the processing state metadata may include the parameters used in and/or derived from the certain processing or any constituent operations in the processing. Additionally and/or optionally, the processing state metadata may include one or more fingerprints computed/extracted from the media data. Additionally and/or optionally, the processing state metadata may include media features of one or more different types computed/extracted from the media data. Media features as described herein provide a semantic description of the media data and may comprise one or more of structural properties, tonality including harmony and melody, timbre, rhythm, reference loudness, stereo mix, or a quantity of sound sources of the media data, absence or presence of voice, repetition characteristics, melody, harmonies, lyrics, timbre, perceptual features, digital media features, stereo parameters, voice recognition (e.g., what a speaker is saying), etc. In some embodiments, the extracted media features are utilized to classify underlying media data into one or more of a plurality of media data classes. The one or more media data classes may include, but are not limited to any of, a single overall/dominant "class" (e.g., a class type) for the entire piece of media and/or a single class that represents a smaller time period (e.g., a class sub-type for a subset/sub-interval of the entire piece) such as a single media frame, a media data block, multiple media frames, multiple media data blocks, a fraction of second, a second, multiple seconds, etc. For example, a class label may be computed and inserted into the bitstream and/or hidden (via reversible or irreversible data hiding techniques) every 32 msec for the bitstream. A class label may be used to indicate one or more class types and/or one or more class sub-types. In a media data frame, the class label may be inserted in a metadata structure that precedes, or alternatively follows, a media data block with which the class label is associated, as illustrated in FIG. 11. Media classes may include, but are not limited to any of, single class types such as music, speech, noise, silence, applause. A media processing device as described herein may also be configured to classify media data comprising mixtures of media class types such as speech over music, etc. Additionally, alternatively, and optionally, a media processing device as described herein may be configured to carry an independent "likelihood" or probability value for a media class type or sub-type indicated by a computed media class label. One or more such likelihood or probability values may be transmitted with the media class label in the same metadata structure. A likelihood or probability value indicates the level of "confidence" that a computed media class label has in relation to the media segment/block for which a media class type or sub-type is indicated by the computed media class label. The one or more likelihood or probability values in combination with the associated media class label may be utilized by a recipient media processing device to adapt media processing in a manner to improve any in a wide variety of operations throughout an entire media processing chain such as upmixing, encoding, decoding, transcoding, headphone virtualization, etc. Processing state metadata may include, but are not limited to any of, media class types or sub-types, likelihood or probability values. Additionally, optionally, or alternatively, instead of passing media class types/subtypes and likelihood/probability values in a metadata structure inserted between media (audio) data blocks, some or all of the media class types/ subtypes and likelihood/probability values may be embedded and passed to a recipient media processing node/device in media data (or samples) as hidden metadata. In some embodiments, the results of content analysis of the media data included in the processing state metadata may comprise one or more indications as to whether certain user-defined or system-defined keywords are spoken in any time segment of the media data. One or more applications may use such indications to trigger performance of related operations (e.g., presenting contextual advertisements of products and services relating to the keywords).

In some embodiments, while processing the media data with a first processor, a device as described herein may run a second processor in parallel to classify/extract media features of the media data. Media feature may be extracted from a segment that lasts for a period of time (one frame, multiple frames, one second, multiple seconds, one minute, multiple minutes, a user-defined time period, etc.), or alternatively for a scene (based on detectable signal characteristic changes). Media features as described by the processing state metadata may be used throughout the entire media processing chain. A downstream device may adapt its own media processing of the media data based on one or more of the media features. Alternatively, a downstream device may choose to ignore the presence of any or all of the media features as described in the processing state metadata.

An application on a device in the media processing chain may leverage the media features in one or more of a variety of ways. For example, such an application may index the underlying media data using the media features. For a user who may want to go to the sections in which judges are talking about performances, the application may skip other preceding sections. Media features as described in the processing state metadata provide downstream devices contextual information of the media data as an intrinsic part of the media data.

More than one device in the media processing chain may perform analysis to extract media features from content of media data. This allows downstream devices not having to analyze the content of the media data.

In some possible embodiment, the generated or modified processing state metadata may be transmitted as a part of a media bitstream (e.g., audio bitstream with metadata on the state of the audio) and amount to a transmission rate in the order of 3-10 kbps. In some embodiments, the processing state metadata may be transmitted inside the media data (e.g., PCM media samples) based on data hiding. A wide variety of data hiding techniques, which may alter the media data reversibly or irreversibly, may be used to hide a part, or all, of the processing state metadata (including but not limited only to authentication related data) in the media samples. Data hiding may be implemented with perceptible or imperceptible secure communication channel. Data hiding may be accomplished by altering/manipulating/modulating signal characteristics (phase and/or amplitude in a frequency or time domain) of a signal in the underlying media samples. Data hiding may be implemented based on FSK, spread spectrum, or other available methods.

In some possible embodiments, a pre/post processing unit may perform processing of the media data in a cooperative manner with the encoder/transcoder. The processing performed by the cooperative pre-post processing unit is also specified in the processing state metadata that is communicated (e.g., via the audio bitstream) to a downstream media processing unit.

In some possible embodiments, once a piece of processing state metadata (which may include media fingerprints and any parameters used in or derived from one or more types of media processing) is derived, this piece of processing state metadata may be preserved by the media processing units in the media processing chain and communicated to all the downstream units. Thus, in some possible embodiments, a piece of processing state metadata may be created by the first media processing unit and passed to the last media processing unit, as embedded data within a media bitstream/sub-stream or as data derivable from an external data source or media processing database, in the media processing chain (whole lifecycle).

Figure 4:
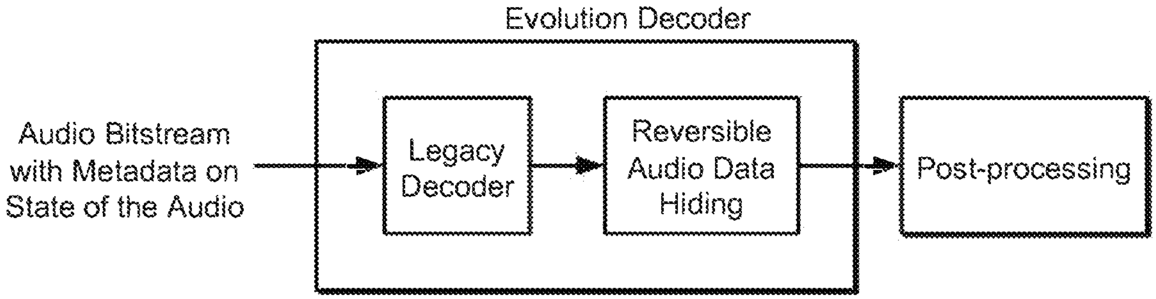
FIG. 4 illustrates an example decoder in accordance with some possible embodiments of the present invention.

FIG. 4 illustrates an example decoder (e.g., an evolution decoder that implements techniques herein) in accordance with some possible embodiments of the present invention. A decoder in possible embodiments of the present invention may be configured (1) to parse and validate the processing state metadata (e.g., a processing history, a description of media features, etc.) associated with incoming media data and other metadata (e.g., independent of any processing of the media data such as third party data, tracking information, identifiers, proprietary or standard information, user annotation data, user preference data, etc.) that has been passed in, and (2) to determine, based on the validated processing state metadata, the media processing state of the media data. For instance, by parsing and validating the processing state metadata in a media bitstream (e.g., audio bitstream with metadata on state of the audio) that carries the input media data and the processing state metadata, the decoder may determine that the loudness metadata (or media feature metadata) is valid and reliable, and was created by one of an enhanced content provider sub-units that implement the techniques described herein (e.g., Dolby media generator (DMG), commercially available from Dolby Laboratories). In some possible embodiments, in response to determining that the processing state metadata received is valid and reliable, the decoder may be configured to then generate, based at least in part on the processing state metadata received, media processing signaling about the state of the media data using a reversible or irreversible data hiding technique. The decoder may be configured to provide the media processing signaling to a downstream media processing unit (e.g., a post-processing unit) in the media processing chain. This type of signaling may be used, for example, when there is no dedicated (and synchronous) metadata path between the decoder and the downstream media processing unit. This situation may arise in some possible embodiments in which the decoder and the downstream media processing unit exist as separate entities in a consumer electronic device (e.g., PCs, mobile phones, set-tops, audio video recorders, etc.), or in different sub-system or different systems in which synchronous control or data path between the decoder and the subsequent processing unit is not available. In some possible embodiments, the media processing signaling under the data-hiding technique herein may be transmitted as a part of a media bitstream and amount to a transmission rate in the order of 16 bps. A wide variety of data hiding techniques, which may alter the media data reversibly or irreversibly, may be used to hide a part, or all, of the processing state metadata in the media samples, including but not limited to any of, perceptible or imperceptible secure communication channels, alterations/manipulations/modulations of narrow band or spread spectrum signal characteristics (phase and/or amplitude in a frequency or time domain) of one or more signals in the underlying media samples, or other available methods.

In some possible embodiments, the decoder may not attempt to pass on all the processing state metadata received; rather, the decoder may only embed enough information (e.g., within the limits of the data-hiding capacity) to change the mode of operation of the downstream media processing unit based on the state of the media data.

In some possible embodiments, redundancy in audio or video signal in the media data may be exploited to carry the state of the media data. In some possible embodiments, without causing any audible or viewable artifacts, some, or all, of the media processing signaling and/or processing state metadata may be hidden in the least significant bits (LSBs) of a plurality of bytes in the media data or hidden in a secure communication channel carried within the media data. The plurality of bytes may be selected based on one or more factors or criteria including whether the LSBs may cause perceptible or viewable artifacts when the media samples with hidden data are rendered by a legacy media processing unit. Other data hiding techniques (e.g., perceptible or imperceptible secure communication channels, FSK based data hiding techniques, etc.), which may alter the media data reversibly or irreversibly, may be used to hide a part, or all, of the processing state metadata in the media samples.

In some possible embodiments, the data-hiding technology may be optional and may not be needed, for example, if the downstream media processing unit is implemented as a part of the decoder. For example, two or more media processing units may share a bus and other communication mechanisms that allow metadata to be passed as out-of-the-band signals without hiding data in media samples from one to another media processing unit.

Figure 5:
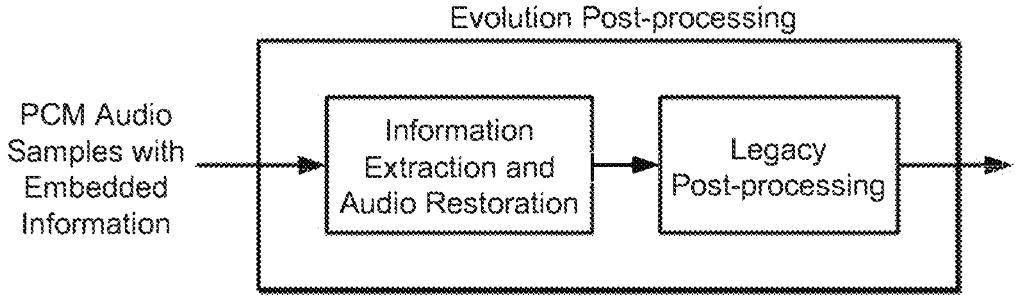
FIG. 5 illustrates an example post-processing unit, in accordance with some possible embodiments of the present invention.

FIG. 5 illustrates an example post-processing unit (e.g., a Dolby evolution post processing unit), in accordance with some possible embodiments of the present invention. The post-processing unit may be configured to first extract the media processing signaling hidden in the media data (e.g., PCM audio samples with embedded information) to determine the state of the media data as indicated by the media processing signaling. This may be done, for example, with an adjunct processing unit (e.g., an information extraction and audio restoration sub-unit in some possible embodiments in which the media data comprises audio). In embodiments where the media processing signaling is hidden using a reversible data hiding technique, prior modifications performed on the media data by the data hiding technique (e.g., the decoder) to embed the media processing signaling may be undone. In embodiments where the media processing signaling is hidden using an irreversible data hiding technique, prior modifications performed on the media data by the data hiding technique (e.g., the decoder) to embed the media processing signaling may not be completely undone but rather side-effects on the quality of media rendering may be minimized (e.g., minimal audio or visual artifacts). Subsequently, based on the state of the media data as indicated by the media processing signaling, the post-processing unit may be configured to adapt its processing to be applied on the media data. In an example, volume processing may be turned-off in response to a determination (from the media processing signaling) that the loudness metadata was valid and that the volume processing was performed by an upstream unit. In another example, a contextual advertisement or message may be presented or triggered by a voice-recognized keyword.

In some possible embodiments, a signal analysis and metadata correction unit in a media processing system described herein may be configured to accept encoded media bitstreams as input and validate whether the embedded metadata in a media bitstream is correct by performing signal analysis. After validating that the embedded metadata is or is not valid within the media bitstream, correction may be applied on an as-needed basis. In some possible embodiments, the signal analysis and metadata correction unit may be configured to perform analyses on media data or samples encoded in the input media bitstreams in time and/or frequency domain(s) to determine media features of the media data. After determining the media features, corresponding processing state metadata (e.g., a description of one or more media features) may be generated and provided to downstream devices relative the signal analysis and metadata correction unit. In some possible embodiments, the signal analysis and metadata correction unit may be integrated with one or more other media processing units in one or more media processing systems. Additionally and/or optionally, the signal analysis and metadata correction unit may be configured to hide media processing signaling in the media data and to signal to a downstream unit (encoder/transcoder/decoder) that the embedded metadata in the media data is valid and has been successfully verified. In some possible embodiments, the signaling data and/or the processing state metadata associated with the media data may be generated and inserted into a compressed media bitstream that carries the media data.

Therefore, techniques as described herein ensure that different processing blocks or media processing units in an enhanced media processing chain (e.g., encoders, transcoders, decoders, pre/post-processing units, etc.) are able to determine the state of the media data. Hence, each of the media processing units may adapt its processing according to the state of the media data as indicated by upstream units. Furthermore, one or more reversible or irreversible data hiding techniques may be used to ensure that signal information about the state of the media data may be provided to downstream media processing units in an efficient manner with minimal amount of required bit rate to transmit the signal information to the downstream media processing units. This is especially useful where there is no metadata path between an upstream unit such as a decoder and a downstream unit such as a post-processing unit, for example, where the post-processing unit is not part of the decoder.

In some possible embodiments, an encoder may be enhanced with or may comprise a pre-processing and metadata validation sub-unit. In some possible embodiments, the pre-processing and metadata validation sub-unit may be configured to ensure the encoder performs adaptive processing of media data based on the state of the media data as indicated by the media processing signaling and/or processing state metadata. In some possible embodiments, through the pre-processing and metadata validation sub-unit, the encoder may be configured to validate the processing state metadata associated with (e.g., included in a media bitstream with) the media data. For example, if the metadata is validated to be reliable, then results from a type of media processing performed may be re-used and new performance of the type of media processing may be avoided. On the other hand, if the metadata is found to be tampered with, then the type of media processing purportedly previously performed may be repeated by the encoder. In some possible embodiments, additional types of media processing may be performed by the encoder on the metadata, once the processing state metadata (including media processing signaling and fingerprint-based metadata retrieval) is found to be not reliable.

If the processing state metadata is determined to be valid (e.g., based on a match of a cryptographic value extracted and a reference cryptographic value), the encoder may also be configured to signal to other media processing units downstream in an enhanced media processing chain that the processing state metadata, e.g., present in the media bitstream, is valid. Any, some, or all, of a variety of approaches may be implemented by the encoder.

Under a first approach, the encoder may insert a flag in an encoded media bitstream (e.g., an "evolution flag") to indicate that the validation of the processing state metadata has already been performed on this encoded media bitstream. The flag may be inserted in such a way that the presence of the flag doesn't affect a "legacy" media processing unit such as a decoder that is not configured to process and make use of processing state metadata as described herein. In an example embodiment, an Audio Compression-3 (AC-3) encoder may be enhanced with a pre-processing and metadata validation sub-unit to set an "evolution flag" in the xbsi2 fields of an AC-3 media bitstream, as specified in ATSC specifications (e.g., ATSC A/52b). This 'bit' may be present in every coded frame carried in the AC-3 media bitstream and may be unused. In some possible embodiments, the presence of this flag in the xbsi2 field does not affect "legacy" decoders already deployed that are not configured to process and make use of processing state metadata as described herein.

Under the first approach, there may be an issue with authenticating the information in xbsi2 fields. For example, a (e.g., malicious) upstream unit may be able to turn "ON" the xbsi2 field without actually validating the processing state metadata and may incorrectly signal to other downstream units that the processing state metadata is valid.

In order to resolve this issue, some embodiments of the present invention may use a second approach. A secure data hiding method (including but not limited to any of a number of data hiding methods to create a secure communication channel within the media data itself such as spread spectrum-based methods, FSK-based methods, and other secure communication channel based methods, etc.) may be used to embed the "evolution flag." This secure method is configured to prevent the "evolution flag" from being passed in plaintext and thus easily attacked by a unit or an intruder intentionally or unintentionally. Instead, under this second approach, a downstream unit may retrieve the hidden data in an encrypted form. Through a decrypting and authenticating sub-process, the downstream unit may verify the correctness of the hidden data and trust the "evolution flag" in the hidden data. As a result, the downstream unit may determine that the processing state metadata in the media bitstream has been previously successfully validated. In various embodiments, any portion of processing state metadata such as "evolution flag" may be delivered by an upstream device to downstream devices in any of one or more cryptographic methods (HMAC-based, or non-HMAC-based).

In some possible embodiments, media data initially may simply be legacy media bitstreams, for example, comprising PCM samples. However, once the media data is processed by one or more media processing units as described herein, the processing state metadata generated by the one or more media processing units comprises the state of the media data as well as relatively detailed information (including but not limited to any of one or more media features determined from the media data) that may be used to decode the media data. In some possible embodiments, the processing state metadata generated may include media fingerprints such as video fingerprints, loudness metadata, dynamic range metadata, one or more hash-based message authentication codes (HMACs), one or more dialogue channels, audio fingerprints, enumerated processing history, audio loudness, dialogue loudness, true-peak values, sample peak values, and/or any user (3rd-party) specified metadata. The processing state metadata may comprise an "evolution data block."

As used herein, the term "enhanced" refers to an ability for a media processing unit under techniques described herein to work in such a manner with other media processing units or other media processing systems under the techniques described herein that may perform adaptive processing based on the state of media data as set by upstream units. The term "evolution" refers to an ability for media processing units under techniques described herein to work in a compatible manner with legacy media processing units or legacy media processing systems as well as to an ability for the media processing units under the techniques herein to work in such a manner with other media processing units or other media processing systems under the techniques described herein that may perform adaptive processing based on the state of media data as set by upstream units.

In some possible embodiments, a media processing unit described herein may receive media data on which one or more types of media processing have been performed, but there may be no metadata or insufficient metadata associated with the media data to indicate the one or more types of media processing. In some possible embodiments, such a media processing unit may be configured to create processing state metadata to indicate the one or more types of media processing that have been performed by other upstream units relative to the media processing unit. Feature extraction that has not been done by upstream devices may also be performed and carried forward the processing state metadata to downstream devices. In some possible embodiments, the media processing unit (e.g., an evolution encoder/transcoder) may comprise a media forensic analysis sub-unit. The media forensic sub-unit such as an audio forensic sub-unit may be configured to determine (without any received metadata) whether a certain type of processing has been performed on a piece of media content or on the media data. The analysis sub-unit may be configured to look for specific signal processing artifacts/traces introduced and left by the certain type of processing. The media forensic sub-unit may also be configured to determine whether a certain type of feature extraction has been performed on a piece of media content or on the media data. The analysis sub-unit may be configured to look for specific presence of feature based metadata. For the purpose of the present invention, the media forensic analysis sub-unit as described herein may be implemented by any media processing unit in a media processing chain. Furthermore, processing state metadata created by a media processing unit via the media forensic analysis sub-unit may be delivered to a downstream unit in the media processing chain herein.

In some possible embodiments, processing state metadata as described herein may include additional reserved bytes for supporting 3rd party applications. The additional reserved bytes may be ensured to be secure by allocating a separate encryption key to scramble any plain text to be carried in one or more fields in the reserved bytes. Embodiments of the present invention support novel applications including content identification and tracking. In an example, media with Nielsen ratings may carry a unique identifier for a program in a (media) media bitstream. Nielsen ratings may then use this unique identifier to compute statistics of viewership or listenership for the program. In another example, the reserved bytes herein may carry keywords for a search engines such as Google. Google may then associate advertisements based on the keywords included in one or more fields in the reserved bytes that carry keywords. For the purpose of the present invention, in applications such as discussed herein, techniques herein may be used to ensure the reserved bytes to be secure and not to be decrypted by anyone other than the 3rd party who is designated to use one or more fields in the reserved bytes.

Processing state metadata as described herein may be associated with media data in any of a number of different ways. In some possible embodiments, the processing state metadata may be inserted in the outgoing compressed media bitstream that carries the media data. In some embodiments, the metadata is inserted in such a way as to maintain backwards compatibility with legacy decoders that are not configured to perform adaptive processing based on the processing state metadata herein.

4. EXAMPLE ADAPTIVE PROCESSING OF MEDIA DATA

Figure 6:
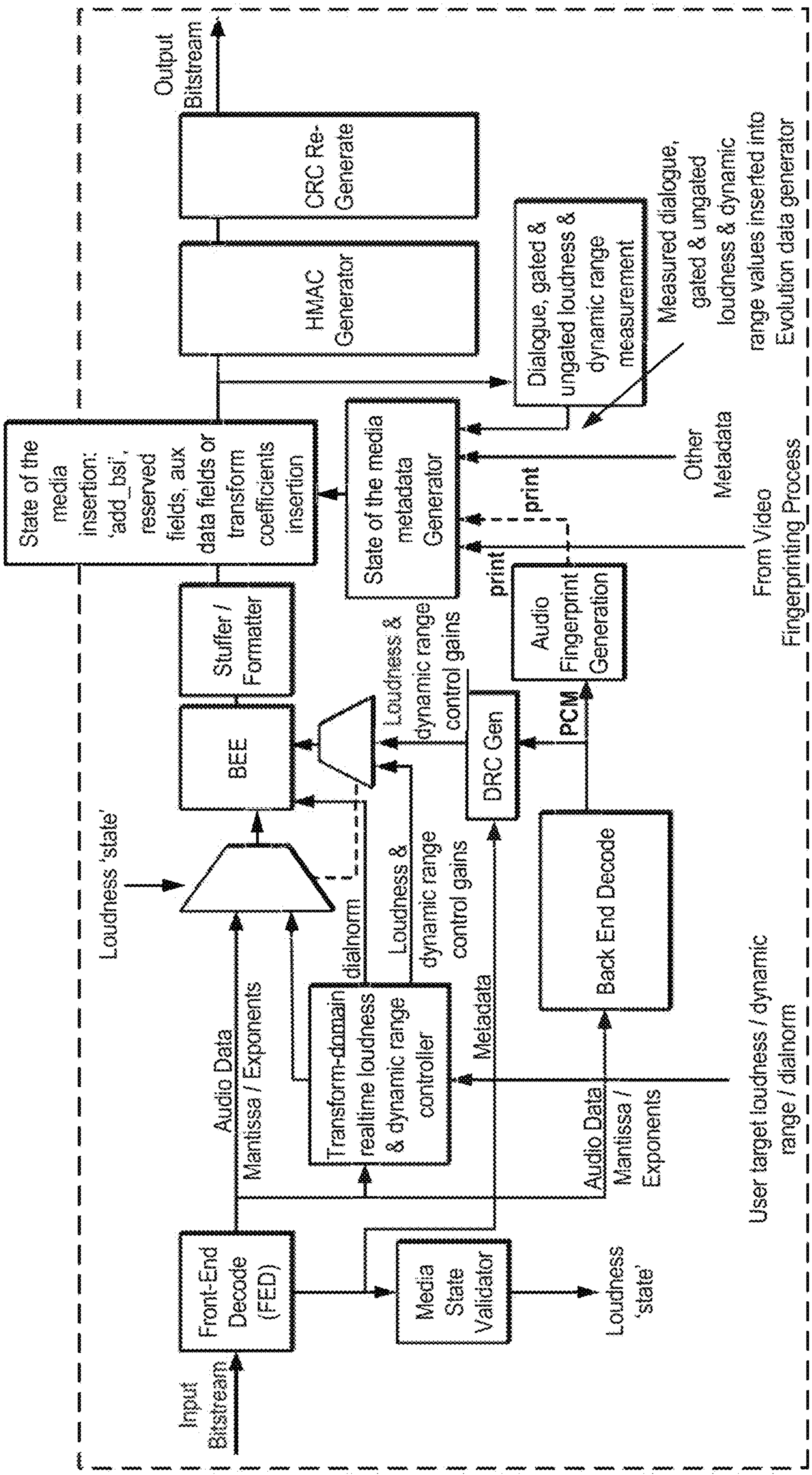
FIG. 6 illustrates an example implementation of an encoder/transcoder, in accordance with some possible embodiments of the present invention.

FIG. 6 illustrates an example implementation of an encoder/transcoder, in accordance with some possible embodiments of the present invention. Any of the components depicted may be implemented as one or more processes and/or one or more IC circuits (including ASICs, FPGAs, etc.), in hardware, software, or a combination of hardware and software. The encoder/transcoder may comprise a number of legacy sub-units such as a front-end decode (FED), a back end decode (full mode) that does not choose to perform dynamic range control/dialogue norm (DRC/Dialnorm) processing based on whether such processing has already been done, a DRC generator (DRC Gen), a back end encode (BEE), a stuffer, a CRC re-generate unit, etc. With these legacy sub-units, the encoder/transcoder would be capable of converting a bitstream (which, for example, may be, but is not limited to, AC-3) to another bitstream comprising results of one or more types of media processing (which, for example, may be, but is not limited to, E AC-3 with adaptive and automated loudness processing). However, the media processing (e.g., the loudness processing) may be performed regardless of whether the loudness processing has been previously performed and/or whether media data in the input bitstream comprises the result of such previous loudness processing and/or whether processing state metadata is in the input bitstream. Thus, an encoder/transcoder with the legacy sub-units alone would perform erroneous or unnecessary media processing.

Under the techniques described herein, in some possible embodiments, as illustrated in FIG. 6, the encoder/transcoder may comprise any of a plurality of new sub-units such as media data parser/validator (which, for example, may be, but is not limited to, an AC-3 flag parser & validator), adjunct media processing (e.g., adaptive transform-domain real time loudness and dynamic range controller, signal analysis, feature extraction, etc.), media fingerprint generation (e.g., audio fingerprint generation), metadata generator (e.g., evolution data generator and/or other medata generator), media processing signaling insertion (e.g., "add_bsi" insertion or insertion to auxiliary data fields), HMAC generator (which may digitally sign one or more, up to all frames to prevent tampering by malicious or legacy entities), one or more of other types of cryptographic processing units, one or more switches that operate based on processing state signaling and/or processing state metadata (e.g., loudness flag "state" received from the flag parser & validator, or flags for media features), etc. In addition, user input (e.g., user target loudness/dialnorm) and/or other input (e.g., from a video fingerprinting process) and/or other metadata input (e.g., one or more types of third party data, tracking information, identifiers, proprietary or standard information, user annotation data, user preference data, etc.) may be received by the encoder/transcoder. As illustrated, measured dialogue, gated and ungated loudness and dynamic range values may also be inserted into the evolution data generator. Other media feature related information may also be injected to a processing unit as described herein to generate a portion of processing state metadata.

In one or more of some possible embodiments, processing state metadata as described herein is carried in the "add_bsi" fields specified in the Enhanced AC-3 (E AC-3) syntax as per ATSC A/52b, or in one or more auxiliary data fields in a media bitstream as described herein. In some possible embodiments, the carriage of processing state metadata in these fields yields no adverse impact to the compressed media bitstream frame size and/or bit rate.

In some possible embodiments, processing state metadata may be included in an independent or dependent sub-stream associated with a main program media bitstream. The advantage of this approach is that the bit rate allocated to encode media data (carried by the main program media bitstream) is not affected. If the processing state metadata is carried as a part of encoded frames, then the bits allocated to encode audio information may be reduced so that the compressed media bitstream frame size and/or bit rate may be unchanged. For instance, the processing state metadata may comprise a reduced data rate representation and take up a low data rate in the order of 10 kbps to transmit between medium processing units. Hence the media data such as audio samples may be coded at a rate lower by 10 kbps in order to accommodate the processing state metadata.

In some possible embodiments, at least a portion of processing state metadata may be embedded with media data (or samples) via reversible or irreversible data hiding techniques. The advantage of this approach is that the media samples and the metadata may be received by downstream devices in the same bitstream.

In some possible embodiments, processing state metadata may be stored in a media processing database linked to fingerprints. A media processing unit downstream to an upstream unit such as an encoder/transcoder that creates the processing state metadata may create a fingerprint from received media data and then use the fingerprint as a key to query the media processing database. After the processing state metadata in the database is located, a data block comprising the processing state metadata associated with (or for) the received media data may be retrieved from the media processing database and made available to the downstream media processing unit. As used herein, fingerprints may include but are not limited to any of one or more media fingerprints generated to indicate media features.

In some possible embodiments, a data block comprising processing state metadata comprises a cryptographic hash (HMAC) for the processing state metadata and/or the underlying media data. Since the data block is supposed to be digitally signed in these embodiments, a downstream media processing unit may relatively easily authenticate and validate the processing state metadata. Other cryptographic methods including but not limited to any of one or more non-HMAC cryptographic methods may be used for secure transmission and receipt of the processing state metadata and/or the underlying media data.

As previously described, a media processing unit such as an encoder/transcoder as described herein may be configured to accept "legacy" media bitstreams and PCM samples. If the input media bitstream is a legacy media bitstream, the media processing unit may check for an evolution flag that may be in the media bitstream or that may be hidden in the media data by one of enhanced "legacy" encoders comprising pre-processing and metadata validation logic as previously described. In the absence of an "evolution flag", the encoder is configured to perform adaptive processing and generate processing state metadata as appropriate in an output media bitstream or in a data block comprising the processing state metadata. For instance, as shown in FIG. 6, an example unit such as "the transform domain real time loudness and dynamic range controller" may adaptively process audio content in the input media data the unit received and automatically adjust loudness and dynamic range if an "evolution flag" is absent in the input media data or source media bitstream. Additionally, optionally, or alternatively, another unit may make use of featured based metadata to perform adaptive processing.

In example embodiments as illustrated in FIG. 6, the encoder may be aware of the post/pre-processing unit that has performed a typed of media processing (e.g., loudness domain processing) and hence may create processing state metadata in a data block that includes the specific parameters used in and/or derived from the loudness domain processing. In some possible embodiments, the encoder may create processing state metadata reflecting processing history on the content in the media data so long as the encoder is aware of the types of processing that have been performed (e.g., the loudness domain processing) on the content in the media data. Additionally, optionally, or alternatively, the encoder may perform adaptive processing based on one or more media features described by the processing state metadata. Additionally, optionally, or alternatively, the encoder may perform analysis of the media data to generate a description of media features as a part of the processing state metadata to be provided to any of other processing units.

In some possible embodiments, a decoder using techniques herein is capable of understanding the state of the media data in the following scenarios.

Under a first scenario, if the decoder receives a media bitstream with the "evolution flag" set to indicate the validity of processing state metadata in the media bitstream, the decoder may parse and/or retrieve the processing state metadata and signal a downstream media processing unit such as an appropriate post-processing unit. On the other hand, if an "evolution flag" is absent, then the decoder may signal to the downstream media processing unit that volume leveling processing should still be performed as the loudness metadata—e.g., which would have been included in the processing state metadata in some possible embodiments, had the volume leveling processing already performed—is either absent or cannot be trusted to be valid.

Under a second scenario, if the decoder receives a media bitstream generated and encoded by an upstream media processing unit such as an evolution encoder with cryptographic hash, then the decoder may parse and retrieve the cryptographic hash from a data block comprising processing state metadata, and use the cryptographic hash to validate the received media bitstream and associated metadata. For instance, if the decoder finds the associated metadata (e.g., loudness metadata in the processing state metadata) to be valid based on a match between a reference cryptographic hash and the cryptographic hash retrieved from the data block, then the decoder may signal to the downstream media processing unit such as a volume leveling unit to pass the media data such as audio unchanged. Additionally, optionally, or alternatively, other types of cryptographic techniques may be used in place of a method based on a cryptographic hash. Additionally, optionally, or alternatively, operations other than volume leveling may also be performed based on one or more media features of the media data as described in the processing state metadata.

Under a third scenario, if the decoder receives a media bitstream generated by an upstream media processing unit such as an evolution encoder, but a data block comprising processing state metadata is not included in the media bitstream; rather the data block is stored in a media processing database. The decoder is configured to create a fingerprint of the media data in the media bitstream such as audio, and then to use the fingerprint to query the media processing database. The media processing database may return the appropriate data block associated with the received media data based on fingerprint matching. In some possible embodiments, the encoded media bitstream contains a simple universal resource locator (URL) for directing the decoder to send the fingerprint-based query as previous discussed to the media processing database.

In all these scenarios, the decoder is configured to understand the state of the media and signal a downstream media processing unit to adapt the latter's processing of the media data accordingly. In some possible embodiments, the media data herein may be re-encoded after being decoded. In some possible embodiments, a data block comprising contemporaneous processing state information corresponding to the re-encoding may be passed onto a downstream media processing unit such as an encoder/converter subsequent to the decoder. For example, the data block may be included as associated metadata in the outgoing media bitstream from the decoder.

Figure 7:
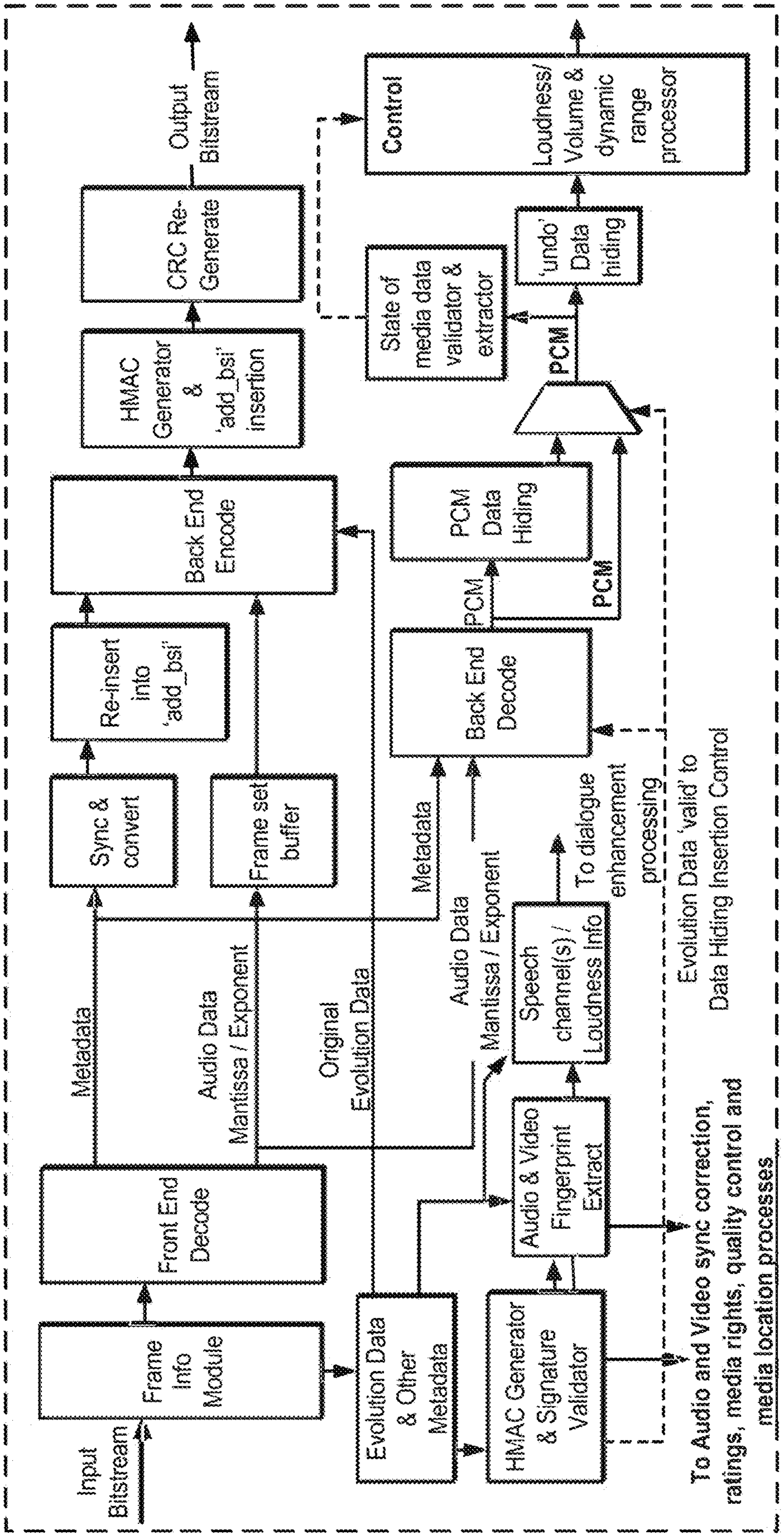
FIG. 7 illustrates an example evolution decoder controlling modes of operation of a volume leveling unit based on the validity of loudness metadata in and/or associated with processing state metadata, in accordance with some possible embodiments of the present invention.

FIG. 7 illustrates an example evolution decoder controlling modes of operation of a volume leveling unit based on the validity of loudness metadata in and/or associated with processing state metadata, in accordance with some possible embodiments of the present invention. Other operations such as feature based processing may also be handled. Any of the components depicted may be implemented as one or more processes and/or one or more IC circuits (including ASICs and FPGAs), in hardware, software, or a combination of hardware and software. The decoder may comprise a number of legacy sub-units such as a frame info module (e.g., a frame info module in AC-3, MPEG AAC, MPEG HE AAC, E AC-3, etc.), a front-end decode (e.g., an FED in AC-3, MPEG AAC, MPEG HE AAC, E AC-3, etc.), synchronization and conversion (e.g., a sync and convert module in AC-3, MPEG AAC, MPEG HE AAC, E AC-3, etc.), frame set buffer, back end decode (e.g., a BED in AC-3, MPEG AAC, MPEG HE AAC, E AC-3, etc.), back end encode (e.g., a BEE in AC-3, MPEG AAC, MPEG HE AAC, E AC-3, etc.), CRC re-generate, media rendering (e.g., Dolby Volume), etc. With these legacy sub-units, the decoder would be capable of conveying media content in media data to a downstream media processing unit and/or rendering the media content. However, the decoder would not be able to convey the state of the media data or to provide media processing signaling and/or processing state metadata in the output bitstream.

Under the techniques herein, in some possible embodiments, as illustrated in FIG. 7, the decoder may comprise any of a plurality of new sub-units such as metadata handling (evolution data and/or other metadata input including one or more types of third party data, tracking information, identifiers, proprietary or standard information, user annotation data, user preference data, feature extraction, feature handling, etc.), secure (e.g., tampering-proof) communication for processing state information (HMAC generator and signature validator, other cryptographic techniques), media fingerprint extract (e.g., audio and video fingerprint extract), adjunct media processing (e.g., speech channel(s)/loudness info, other types of media features), data hiding (e.g., PCM data hiding which may be destructive/irreversible or reversible), media processing signaling insertion, HMAC generator (which may, for example, include "add_bsi" insertion, or insertions into one or more auxiliary data fields), other cryptographic techniques, hidden data recovery and validation (e.g., hidden PCM data recovery & validator), "undo" data hiding, one or more switches that operate based on processing state signaling and/or processing state metadata (e.g., evolution data "valid" and data hiding insertion control from an HMAC generator & signature validator), etc. As illustrated, information extracted by the HMAC generator & signature validator and the audio & video fingerprint extract may be outputted to, or used for, audio and video sync correction, ratings, media rights, quality control, media location processes, feature based processing, etc.

In some possible embodiments, a post/pre-processing unit in a media processing chain does not operate independently. Rather, the post/pre-processing unit may interact with an encoder or a decoder in the media processing chain. In the case of interacting with an encoder, the post/pre-processing unit may help create at least a part of processing state metadata about the state of the media data in a data block. In the case of interacting with a decoder, the post/pre-processing unit is configured to determine the state of the media data and to adapt its processing of the media data accordingly. In an example, in FIG. 7, an example post/pre-processing unit such as a volume leveling unit may retrieve the hidden data in the PCM samples sent by an upstream decoder and to determine, based on the hidden data, whether or not loudness metadata is valid. If the loudness metadata is valid, the input media data such as audio may be passed unchanged through the volume leveling unit. In another example, an example post/pre-processing unit may retrieve the hidden data in the PCM samples sent by an upstream decoder and to determine, based on the hidden data, one or more types of media features previously determined from the content of the media samples. If a voice recognized keyword is indicated, the post-preprocessing unit may perform one or more specific operations related to the voice recognized keyword.

5. DATA HIDING

Figure 8:
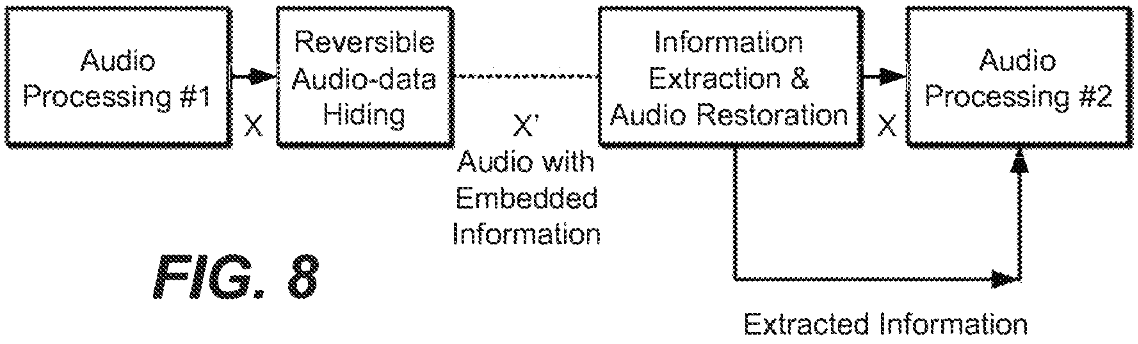
FIG. 8 illustrates example configuration of using data hiding to pass media processing information, in accordance with some possible embodiments of the present invention.

FIG. 8 illustrates example configuration of using data hiding to pass media processing information, in accordance with some possible embodiments of the present invention. In some possible embodiments, data hiding may be used to enable signaling between an upstream media processing unit such as an evolution encoder or decoder (e.g., audio processing #1) and a downstream media processing unit such as a post/pre-processing unit (e.g., audio processing #2) when there is no metadata path between the upstream and downstream media processing units.

In some possible embodiments, reversible media data hiding (e.g., reversible audio-data hiding) may be used to modify media data samples (e.g., X) in the media data into modified media data samples (e.g., X') that carry media processing signaling and/or processing state metadata between the two media processing units. In some possible embodiments, the modification to the media data samples described herein is done in such a way that there is no perceptual degradation as a result of the modification. Thus, even if there may not be another media processing unit subsequent to media processing unit 1, no audible or viewable artifacts may be perceived with the modified media data samples. In other words, hiding the media processing signaling and/or the processing state metadata in a perceptually transparent way would not cause any audible or viewable artifacts when audio and video in the modified media data samples is rendered.

In some possible embodiments, a media processing unit (e.g., audio processing unit #2 of FIG. 8) retrieves the embedded media processing signaling and/or processing state metadata from the modified media data samples, and restores the modified media data samples into the original media data samples by undoing the modifications. This may be done, for example, through a sub-unit (e.g., information extraction and audio restoration). The retrieved embedded information may then serve as a signaling mechanism between the two media processing units (e.g., audio processing units #1 and #2 of FIG. 8). The robustness of the data-hiding technique herein may be dependent on what types of processing that may be performed by the media processing units. An example of media processing unit #1 may be a digital decoder in a set-top box, while an example of media processing unit #2 may be a volume leveling unit in the same set-top box. If the decoder determines that the loudness metadata is valid, the decoder may use a reversible data-hiding technique to signal the subsequent volume leveling unit to not apply leveling.

In some possible embodiments, irreversible media data hiding (e.g., an irreversible secure communication channel based data hiding technique) may be used to modify media data samples (e.g., X) in the media data into modified media data samples (e.g., X') that carry media processing signaling and/or processing state metadata between the two media processing units. In some possible embodiments, the modification to the media data samples described herein is done in such a way that there is a minimal perceptual degradation as a result of the modification. Thus, minimal audible or viewable artifacts may be perceived with the modified media data samples. In other words, hiding the media processing signaling and/or the processing state metadata in a perceptually transparent way would cause minimal audible or viewable artifacts when audio and video in the modified media data samples is rendered.

In some possible embodiments, modifications in the modified media data samples through irreversible data hiding may not be undone to recover the original media data samples.

6. EXAMPLE PROCESS FLOW

Figure 9A:
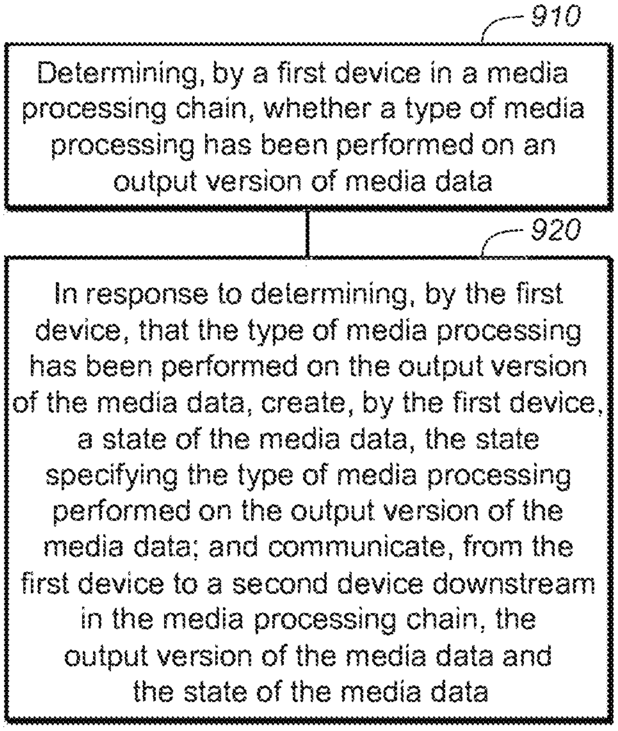
FIG. 9A and FIG. 9B illustrate example process flows according to a possible embodiment of the present invention.
Figure 9B:
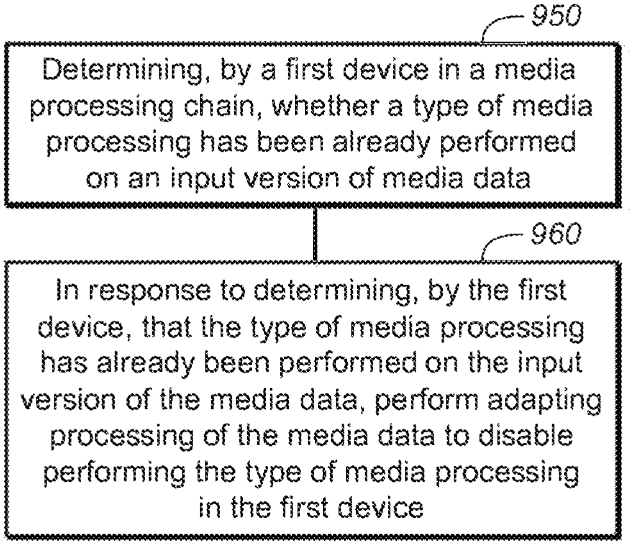

FIG. 9A and FIG. 9B illustrate example process flows according to a possible embodiment of the present invention. In some possible embodiments, one or more computing devices or units in a media processing system may perform this process flow.

In block 910 of FIG. 9A, a first device in a media processing chain (e.g., an enhanced media processing chain as described herein) determines whether a type of media processing has been performed on an output version of media data. The first device may be a part, or the whole, of a media processing unit. In block 920, in response to determining that the type of media processing has been performed on the output version of the media data, the first device may create a state of the media data. In some possible embodiments, the state of the media data may specify the type of media processing, the result of which is included in the output version of the media data. The first device may communicate, to a second device downstream in the media processing chain, the output version of the media data and the state of the media data, e.g., in an output media bitstream, or in an auxiliary metadata bitstream associated with a separate media bitstream that carries the output version of the media data.

In some possible embodiments, the media data comprises media content as one or more of: audio content only, video content only, or both audio content and video content.

In some possible embodiments, the first device may provide, to the second device, the state of the media data as one or more of: (a) media fingerprints, (b) processing state metadata, or (c) media processing signaling.

In some possible embodiments, the first device may store a media processing data block at a media processing database. The media processing data block may comprise media processing metadata, and wherein the media processing data block is retrievable based on one or more media fingerprints that are associated with the media processing data block.

In some possible embodiments, the state of media data comprises a cryptographic hash value encrypted with credential information. The cryptographic hash value may be authenticated by a recipient device.

In some embodiments, at least a portion of the state of media data comprises one or more secure communication channels hidden in the media data, and wherein the one or more secure communication channels are to be authenticated by a recipient device. In an example embodiment, the one or more secure communication channels may comprise at least one spread spectrum secure communication channel. In an example embodiment, the one or more secure communication channels comprise at least one frequency shift keying secure communication channel.

In some possible embodiments, the state of the media data comprises one or more sets of parameters that are used in and/or derived from the type of media processing.

In some possible embodiments, at least one of the first device or the second device comprises one or more of pre-processing units, encoders, media processing sub-units, transcoders, decoders, post-processing units, or media content rendering sub-units. In an example embodiment, the first device is an encoder (e.g., an AVC encoder), while the second device is a decoder (e.g., an AVC decoder).

In some possible embodiments, the type of processing is performed by the first device, while, in some other possible embodiments, the type of processing is instead performed by an upstream device, relative to the first device, in the media processing chain.

In some possible embodiments, the first device may receive an input version of the media data. The input version of the media data does comprise any state of the media data that indicates the type of media processing. In these embodiments, the first device may analyze the input version of the media data to determine the type of media processing that had already been performed on the input version of the media data.

In some possible embodiments, the first device encodes loudness and dynamic range in the state of media data.

In some possible embodiments, the first device may adaptively avoid performing the type of media processing that has been performed by an upstream device. However, even when the type of media processing has been performed, the first device may receive a command to override the type of media processing performed by the upstream device. Instead, the first device may be commanded to still perform the type of media processing, e.g., with either the same or different parameters. The state of media data that communicated from the first device to a second device downstream in the media processing chain may comprise an output version of the media data including the result of the type of media processing performed by the first device under the command and a state of the media data that indicates that the type of media processing has already been performed in the output version of the media data. In various possible embodiments, the first device may receive the command from one of: (a) user input, (b) a system configuration of the first device, (c) signaling from a device external to the first device, or (d) signaling from a sub-unit within the first device.

In some embodiments, the state of the media data comprises at least a portion of state metadata hidden in one or more secure communication channels.

In some embodiments, the first device alters a plurality of bytes in the media data to store at least a portion of the state of the media data.

In some embodiments, at least one of the first device and the second device comprises one or more of Advanced Television Systems Committee (ATSC) codecs, Moving Picture Experts Group (MPEG) codecs, Audio Codec 3 (AC-3) codecs, and Enhanced AC-3 codecs.

In some embodiments, the media processing chain comprises: a pre-processing unit configured to accept time-domain samples comprising media content as input and to output processed time-domain samples; an encoder configured to output compressed media bitstream of the media content based on the processed time-domain samples; a signal analysis and metadata correction unit configured to validate processing state metadata in the compressed media bitstream; a transcoder configured to modify the compressed media bitstream; a decoder configured to output decoded time-domain samples based on the compressed media bitstream; and a post-processing unit configured to perform post-processing of the media content in the decoded time-domain samples. In some embodiments, at least one of the first device and the second device comprises one or more of the pre-processing unit, the signal analysis and metadata correction unit, the transcoder, the decoder, and the post-processing unit. In some embodiments, at least one of the pre-processing unit, the signal analysis and metadata correction unit, the transcoder, the decoder, and the post-processing unit performs adaptive processing of the media content based on processing metadata received from an upstream device.

In some embodiments, the first device determines one or more media features from the media data, and includes a description of the one or more media features in the state of media data. The one or more media features may comprise at least one media feature determined from one or more of frames, seconds, minutes, user-definable time intervals, scenes, songs, music pieces, and recordings. The one or more media features comprise a semantic description of the media data. In various embodiments, the one or more media features comprise one or more of structural properties, tonality including harmony and melody, timbre, rhythm, loudness, stereo mix, a quantity of sound sources of the media data, absence or presence of voice, repetition characteristics, melody, harmonies, lyrics, timbre, perceptual features, digital media features, stereo parameters, one or more portions of speech content.

In block 950 of FIG. 9B, a first device in a media processing chain (e.g., an enhanced media processing chain as described herein) determines whether a type of media processing has already been performed on an input version of media data.

In block 960, in response to determining that the type of media processing has already been performed on the input version of the media data, the first device adapts processing of the media data to disable performing the type of media processing in the first device. In some possible embodiments, the first device may turn off one or more types of media processing based on an input state of the media data.

In some possible embodiments, the first device communicates, to a second device downstream in the media processing chain, an output version of the media data and a state of the media data that indicates that the type of media processing has already been performed in the output version of the media data.

In some possible embodiments, the first device may encode loudness and dynamic range in the state of media data. In some possible embodiments, the first device may automatically perform one or more of adapting corrective loudness or dynamics audio processing based at least in part on whether the type of processing has already been performed on the input version of the media data.

In some possible embodiments, the first device may perform a second different type of media processing on the media data. The first device may communicate, to a second device downstream in the media processing chain, an output version of the media data and a state of the media data that indicates that the type of media processing and the second different type of media processing have already been performed in the output version of the media data.

In some possible embodiments, the first device may retrieve an input state of the media data that is associated with the input version of the media data. In some possible embodiments, the input state of the media data is carried with the input version of the media data in an input media bitstream. In some possible embodiments, the first device may extract the input state of the media data from data units in the media data that encode media content. The input state of the media data may be hidden in one or more of the data units.

In some possible embodiments, the first device may recover a version of the data units that do not comprise the input state of the media data and rendering the media content based on the version of the data unit that have been recovered.

In some possible embodiments, the first device may authenticate the input state of media data by validating a cryptographic hash value associated with the input state of the media data.

In some embodiments, the first device authenticates the input state of media data by validating one or more fingerprints associated with the input state of the media data, wherein at least one of the one or more fingerprints is generated based on at least a portion of the media data.

In some embodiments, the first device validates the media data by validating one or more fingerprints associated with the input state of the media data, wherein at least one of the one or more fingerprints is generated based on at least a portion of the media data.

In some possible embodiments, the first device may receive the input state of the media data as described with processing state metadata. The first device may create media processing signaling based at least in part on the processing state metadata. The media processing signaling may indicate the input state of the media data, even though the media processing signaling may be of a smaller data volume and/or require a low bit rate than that of the processing state metadata. The first device may transmit the media processing signaling to a media processing device downstream to the first device in the media processing chain. In some possible embodiments, the media processing signaling is hidden in one or more data units in an output version of the media data using a reversible data hiding technique such that one or more modifications to the media data are removable by a recipient device. In some embodiments, the media processing signaling is hidden in one or more data units in an output version of the media data using an irreversible data hiding technique such that at least one of one or more modifications to the media data is not removable by a recipient device In some embodiments, the first device determines one or more media features based on a description of the one or more media features in the state of media data. The one or more media features may comprise at least one media feature determined from one or more of frames, seconds, minutes, user-definable time intervals, scenes, songs, music pieces, and recordings. The one or more media features comprise a semantic description of the media data. In some embodiments, the first device performs one or more specific operations in response to determining the one or more media features.

In some possible embodiments, a method is provided, comprising: computing, with a first device in a media processing chain, one or more data rate reduced representations of a source frame of media data; and carrying the one or more data rate reduced representations simultaneously and securely, within a state of the media data itself, to a second device in the media processing chain; wherein the method is performed by one or more computing devices.

In some possible embodiments, the one or more data rate reduced representations are carried in at least one of a sub-stream, one or more reserved fields, an add_bsi field, one or more auxiliary data fields, or one or more transform coefficients.

In some possible embodiments, the one or more data rate reduced representations comprise synchronization data used for synchronizing audio and video delivered within the media data.

In some possible embodiments, the one or more data rate reduced representations comprise media fingerprints (a) generated by a media processing unit and (b) embedded with the media data for one or more of quality monitoring, media ratings, media tracking, or content search.

In some possible embodiments, the method further comprises computing and transmitting, by at least one of the one or more computing devices in the media processing chain, a cryptographic hash value based on the media data and/or the state of the media data within one or more encoded bitstreams that carry the media data.

In some possible embodiments, the method further comprises: authenticating, by a recipient device, the cryptographic hash value; signaling, by the recipient device to one or more downstream media processing units, a determination of whether the state of the media data is valid; signaling, by the recipient device to the one or more downstream media processing units, the state of the media data in response to determining that the state of the media data is valid.

In some possible embodiments, the cryptographic hash value representing the state of the media and/or the media data is carried in at least one of a sub-stream, one or more reserved fields, an add_bsi field, one or more auxiliary data fields, or one or more transform coefficients.

In some possible embodiments, a method is provided comprising: adaptively processing, with one or more computing devices in a media processing chain comprising one or more of psychoacoustic units, transforms, waveform/spatial audio coding units, encoders, decoders, transcoders, or stream processors, an input version of media data based on a past history of loudness processing of the media data by one or more upstream media processing units as indicated by a state of the media data; normalizing loudness and/or dynamic range of an output version of the media data at an end of the media processing chain to consistent loudness and/or dynamic range values.

In some possible embodiments, the consistent loudness value comprises a loudness value of (1) controlled or selected by a user or (2) adaptively signaled by a state in the input version of the media data.

In some possible embodiments, the loudness value is computed on the dialogue (speech) portions of the media data.

In some possible embodiments, the loudness value is computed on the absolute, relative and/or un-gated portions of the media data.

In some possible embodiments, the consistent dynamic range value comprises a dynamic range value of (1) controlled or selected by a user or (2) adaptively signaled by a state in the input version of the media data.

In some possible embodiments, the dynamic range value is computed on the dialogue (speech) portions of the media data.

In some possible embodiments, the dynamic range value is computed on absolute, relative and/or un-gated portions of the media data.

In some possible embodiments, the method further comprises: computing one or more loudness and/or dynamic range gain control values for normalizing the output version of the media data to a consistent loudness value and consistent dynamic range; simultaneously carrying the one or more loudness and/or dynamic range gain control values within a state of the output version of the media data at the end of the media processing chain, wherein the one or more loudness and/or dynamic range gain control values are usable by another device to reversely applying the one or more loudness and/or dynamic range gain control values to recover an original loudness value and an original dynamic range in the input version of the media data.

In some possible embodiments, the one or more one or more loudness and/or dynamic range control values representing the state of the output version of the media data are carried in at least one of a sub-stream, one or more reserved fields, an add_bsi field, one or more auxiliary data fields, or one or more transform coefficients.

In some possible embodiments, a method is provided comprising performing one of inserting, extracting or editing of related and un-related media data locations and/or a state of related and un-related media data locations within one or more encoded bitstreams by one or more computing devices in a media processing chain comprising one or more of psychoacoustic units, transforms, waveform/spatial audio coding units, encoders, decoders, transcoders, or stream processors.

In some possible embodiments, the one or more related and un-related media data locations and/or the state of related and un-related media data locations within encoded bitstreams are carried in at least one of a sub-stream, one or more reserved fields, an add_bsi field, one or more auxiliary data fields, or one or more transform coefficients.

In some possible embodiments, a method is provided comprising performing one or more of inserting, extracting or editing of related and un-related media data and/or a state of related and un-related media data within one or more encoded bitstreams by one or more computing devices in a media processing chain comprising one or more of psychoacoustic units, transforms, waveform/spatial audio coding units, encoders, decoders, transcoders, or stream processors.

In some possible embodiments, the one or more related and un-related media data and/or the state of related and un-related media data within encoded bitstreams are carried in at least one of a sub-stream, one or more reserved fields, an add_bsi field, one or more auxiliary data fields, or one or more transform coefficients.

In some possible embodiments, a media processing system is configured to compute and carry cryptographic hash values based on media data and/or a state of the media data within one or more encoded bitstreams by one or more computing devices in a media processing chain comprising one or more of psychoacoustic units, transforms, waveform/spatial audio coding units, encoders, decoders, transcoders, or stream processors.

As used herein, the term "related and un-related media data locations" may refer to information that may include a media resource locator such as an absolute path, relative path and/or URL indicating the location of related media (e.g. a copy of media in a different bitstream format) or an absolute path, relative path and/or URL indicating the location un-related media or other type of information that is not directly related to the essence or the bitstream the media data location is found in. (e.g. the location of a new piece of media such as a commercial, advert, web page, etc.).

As used herein, the term "state of related and un-related media data locations" may refer to the validity of the related and un-related media locations (since they can be edited/updated throughout the lifecycle of the bitstreams they are carried within).

As used herein, "related media data" may refer to the carriage of related media data in the form of secondary media data bitstreams highly correlated with the primary media the bitstream represents. (e.g. carriage of a copy of the media data in a second (independent) bitstream format. In the un-related media data context, this information could refer to the carriage of secondary media data bitstreams that are independent of the primary media data.

As used herein, "state" for related media data may refer to any signaling information (processing history, updated target loudness, etc. . . . ) and/or metadata as well as the validity of the related media data. "State" for un-related media data may refer to independent signaling information and/or metadata including validity info that could be carried separately (independently) from the state of the "related" media data. The state of the un-related media data represents media data that is "unrelated" to the media data bitstream this information is found in. (since this information could be independently edited/updated throughout the lifecycle of the bitstreams they are carried within).

As used herein, the terms "absolute, relative and/or ungated portions of the media data" relate to the gating of loudness and/or level measurements performed on the media data. Gating refers to a specific level or loudness threshold where computed value that exceed the threshold are included in the final measurement. (e.g. ignoring short term loudness value below −60 dBFS in the final measured value) Gating on an absolute value is referring to a fixed level or loudness, where gating on a relative value is referring to a value that is dependent on the current "ungated" measurement value.

FIG. 12A through FIG. 12L further illustrate block diagrams of some example media processing nodes/devices, according to some embodiments of the present invention.

Figure 12A:
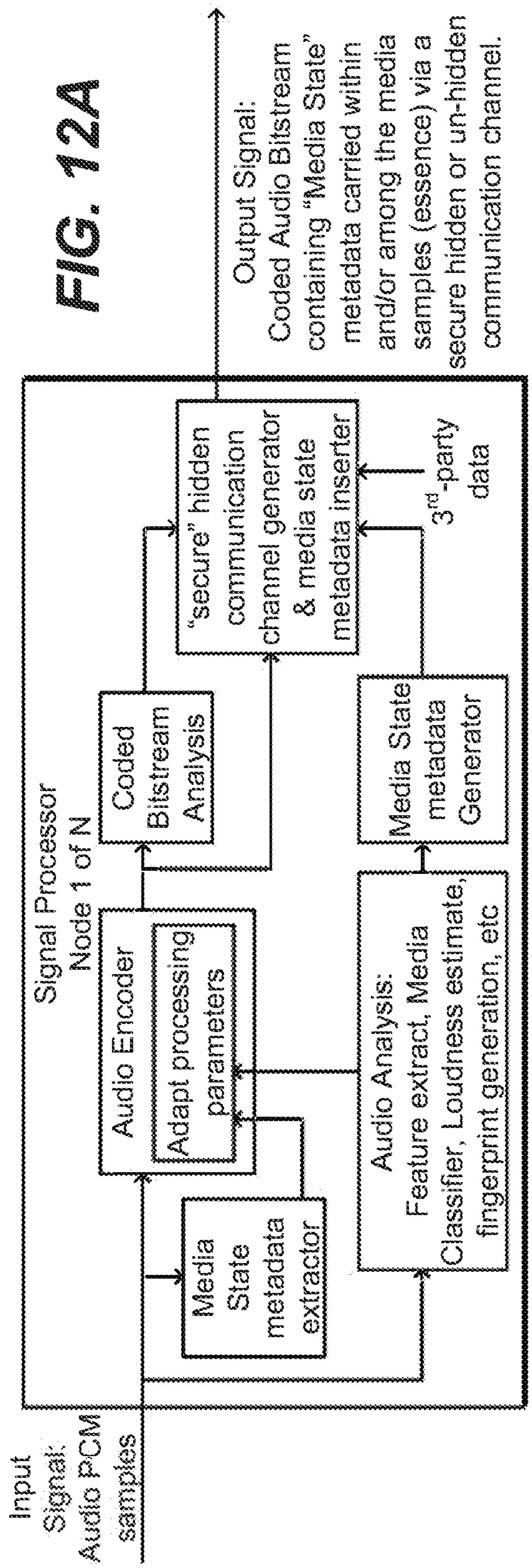
FIG. 12A through FIG. 12L, which is divided into

As illustrated in FIG. 12A, a signal processor (which may be Node 1 of N nodes) is configured to receive an input signal, which may comprise audio PCM samples. The audio PCM samples may or may not contain processing state metadata (or media state metadata) hidden among the audio PCM samples. The signal processor of FIG. 12A may comprise a media state metadata extractor that is configured to decode, extract, and/or interpret the processing state metadata from the audio PCM samples, as provided by one or more media processing units prior to the signal processor of FIG. 12A. At least a part of the processing state metadata may be provided to an audio encoder in the signal processor of FIG. 12A to adapt processing parameters for the audio encoder. In parallel, an audio analysis unit in the signal processor of FIG. 12A may analyze the media content passed in the input signal. Feature extraction, media classification, loudness estimate, fingerprint generation, etc., may be implemented as a part of the analysis performed by the audio analysis unit. At least a part of the results of this analysis may be provided to the audio encoder in the signal processor of FIG. 12A to adapt processing parameters for the audio encoder. The audio encoder encodes the audio PCM samples in the input signal into a coded bitstream in an output signal based on the processing parameters. A coded bitstream analysis unit in the signal processor of FIG. 12A may be configured to determine whether media data or samples in the coded bitstream to be transmitted in the output signal of the signal processor of FIG. 12A have room to store at least a portion of processing state metadata. The new processing state metadata to be transmitted by the signal processor of FIG. 12A comprise some or all of the processing state metadata that was extracted by the media state metadata extractor, the processing state metadata that was generated by the audio analysis unit and a media state metadata generator of the signal processor of FIG. 12A, and/or any 3$^{rd}$ party data. If it is determined that the media data or samples in the coded bitstream have room to store at least a portion of processing state metadata, a part or all of the new processing state metadata may be stored as hidden data in the media data or samples in the output signal. Additionally, optionally, or alternatively, a part or all of the new processing state metadata may be stored in separate metadata structure apart from the media data and samples, in the output signal. Thus, the output signal may comprise a coded bitstream containing the new processing state (or "media state") metadata carried within and/or among the media samples (essence) via a secure hidden or un-hidden communication channel.

Figure 12B:
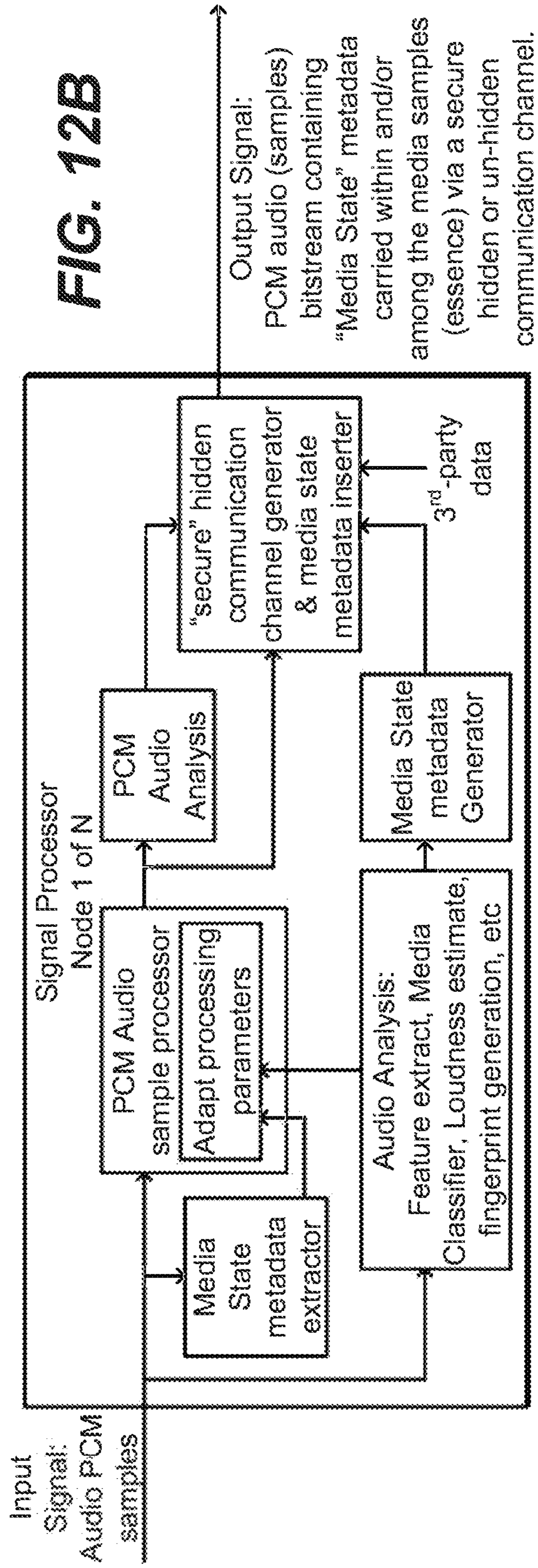

As illustrated in FIG. 12B, a signal processor (which may be Node 1 of N nodes) is configured to receive an input signal, which may comprise audio PCM samples. The audio PCM samples may or may not contain processing state metadata (or media state metadata) hidden among the audio PCM samples. The signal processor of FIG. 12B may comprise a media state metadata extractor that is configured to decode, extract, and/or interpret the processing state metadata from the audio PCM samples, as provided by one or more media processing units prior to the signal processor of FIG. 12B. At least a part of the processing state metadata may be provided to a PCM audio sample processor in the signal processor of FIG. 12B to adapt processing parameters for the PCM audio sample processor. In parallel, an audio analysis unit in the signal processor of FIG. 12B may analyze the media content passed in the input signal. Feature extraction, media classification, loudness estimate, fingerprint generation, etc., may be implemented as a part of the analysis performed by the audio analysis unit. At least a part of the results of this analysis may be provided to the audio encoder in the signal processor of FIG. 12B to adapt processing parameters for the PCM audio sample processor. The PCM audio sample processor processes the audio PCM samples in the input signal into a PCM audio (samples) bitstream in an output signal based on the processing parameters. A PCM audio analysis unit in the signal processor of FIG. 12B may be configured to determine whether media data or samples in the PCM audio bitstream to be transmitted in the output signal of the signal processor of FIG. 12B have room to store at least a portion of processing state metadata. The new processing state metadata to be transmitted by the signal processor of FIG. 12B comprise some or all of the processing state metadata that was extracted by the media state metadata extractor, the processing state metadata that was generated by the audio analysis unit and a media state metadata generator of the signal processor of FIG. 12B, and/or any 3$^{rd}$ party data. If it is determined that the media data or samples in the PCM audio bitstream have room to store at least a portion of processing state metadata, a part or all of the new processing state metadata may be stored as hidden data in the media data or samples in the output signal. Additionally, optionally, or alternatively, a part or all of the new processing state metadata may be stored in separate metadata structure apart from the media data and samples, in the output signal. Thus, the output signal may comprise a PCM audio bitstream containing the new processing state (or "media state") metadata carried within and/or among the media samples (essence) via a secure hidden or un-hidden communication channel.

Figure 12C:
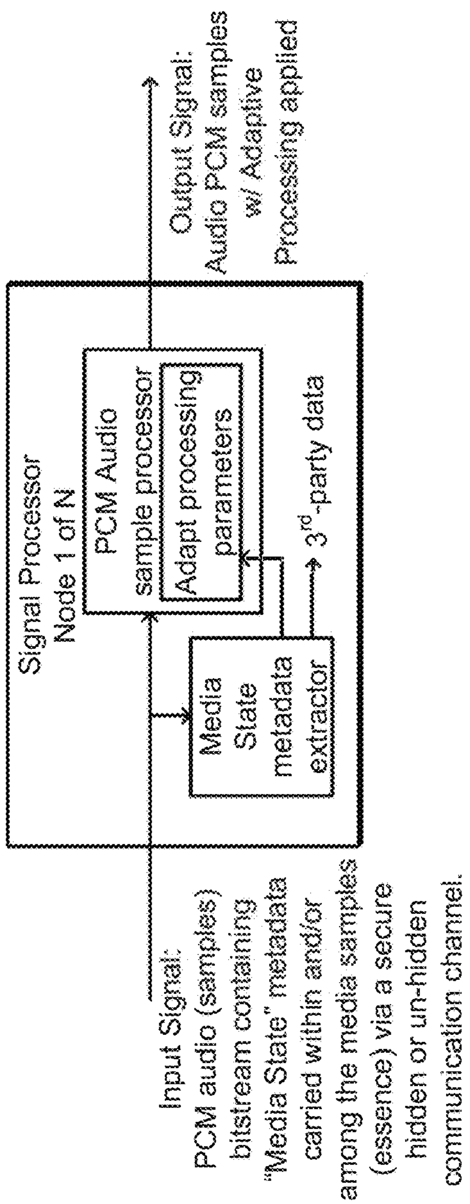

As illustrated in FIG. 12C, a signal processor (which may be Node 1 of N nodes) is configured to receive an input signal, which may comprise a PCM audio (samples) bitstream. The PCM audio bitstream may contain processing state metadata (or media state metadata) carried within and/or among media samples (essence) in the PCM audio bitstream via a secure hidden or un-hidden communication channel. The signal processor of FIG. 12C may comprise a media state metadata extractor that is configured to decode, extract, and/or interpret the processing state metadata from the PCM audio bitstream. At least a part of the processing state metadata may be provided to a PCM audio sample processor in the signal processor of FIG. 12C to adapt processing parameters for the PCM audio sample processor. The processing state metadata may include a description of media features, media class types or sub-types, or likelihood/probability values, as determined by one or more media processing units prior to the signal processor of FIG. 12C, which the signal processor of FIG. 12C may be configured to use without performing its own media content analysis. Additionally, optionally, or alternatively, the media state metadata extractor may be configured to extract 3$^{rd}$ party data from the input signal and transmit the 3$^{rd}$ party data to a downstream processing node/entity/device. In an embodiment, the PCM audio sample processor processes the PCM audio bitstream into audio PCM samples an output signal based on the processing parameters set based on the processing state metadata provided by the one or more media processing units prior to the signal processor of FIG. 12C.

Figure 12D:
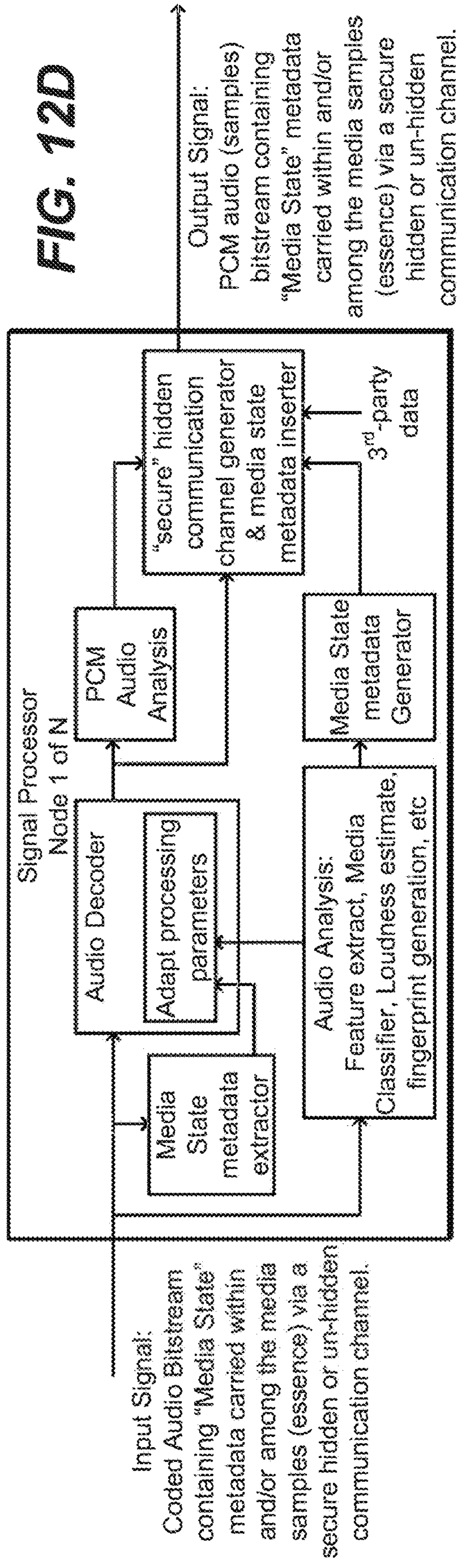

As illustrated in FIG. 12D, a signal processor (which may be Node 1 of N nodes) is configured to receive a input signal, which may comprise a coded audio bitstream containing processing state metadata (or media state metadata) carried within and/or hidden among the media samples via a secure hidden or un-hidden communication channel. The signal processor of FIG. 12D may comprise a media state metadata extractor that is configured to decode, extract, and/or interpret the processing state metadata from the coded bitstream, as provided by one or more media processing units prior to the signal processor of FIG. 12D. At least a part of the processing state metadata may be provided to an audio decoder in the signal processor of FIG. 12D to adapt processing parameters for the audio decoder. In parallel, an audio analysis unit in the signal processor of FIG. 12D may analyze the media content passed in the input signal. Feature extraction, media classification, loudness estimate, fingerprint generation, etc., may be implemented as a part of the analysis performed by the audio analysis unit. At least a part of the results of this analysis may be provided to the audio decoder in the signal processor of FIG. 12D to adapt processing parameters for the audio decoder. The audio decoder transforms the coded audio bitstream in the input signal into a PCM audio bitstream in an output signal based on the processing parameters. A PCM audio analysis unit in the signal processor of FIG. 12D may be configured to determine whether the media data or samples in the PCM audio bitstream has room to store at least a portion of processing state metadata. The new processing state metadata to be transmitted by the signal processor of FIG. 12D comprise some or all of the processing state metadata that was extracted by the media state metadata extractor, the processing state metadata that was generated by the audio analysis unit and a media state metadata generator of the signal processor of FIG. 12D, and/or any 3$^{rd}$ party data. If it is determined that the media data or samples in the PCM audio bitstream have room to store at least a portion of processing state metadata, a part or all of the new processing state metadata may be stored as hidden data in the media data or samples in the output signal. Additionally, optionally, or alternatively, a part or all of the new processing state metadata may be stored in separate metadata structure apart from the media data and samples, in the output signal. Thus, the output signal may comprise a PCM audio (samples) bitstream containing processing state (or "media state") metadata carried within and/or among the media data/samples (essence) via a secure hidden or un-hidden communication channel.

Figure 12E:
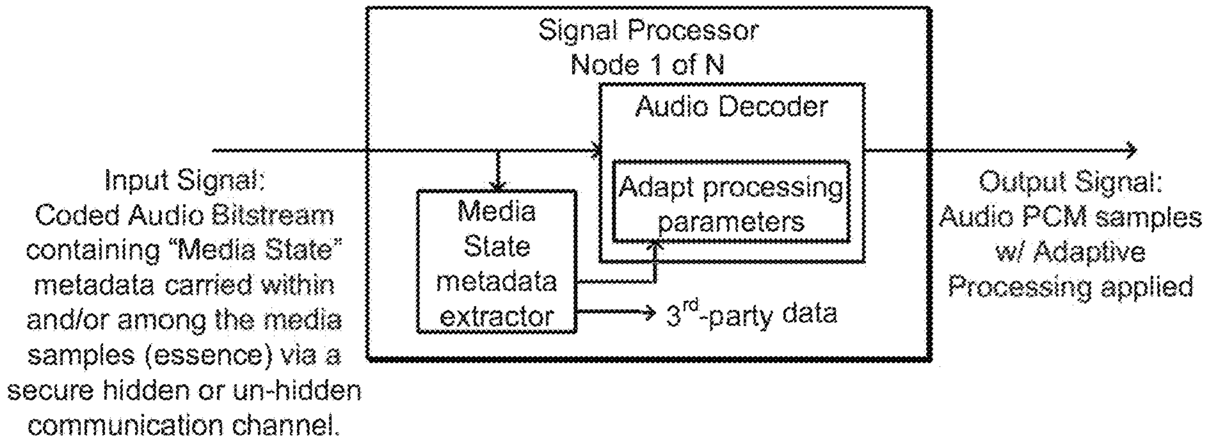

As illustrated in FIG. 12E, a signal processor (which may be Node 1 of N nodes) is configured to receive an input signal, which may comprise a coded audio bitstream. The coded audio bitstream may contain processing state metadata (or media state metadata) carried within and/or among media samples (essence) in the coded audio bitstream via a secure hidden or un-hidden communication channel. The signal processor of FIG. 12E may comprise a media state metadata extractor that is configured to decode, extract, and/or interpret the processing state metadata from the coded audio bitstream. At least a part of the processing state metadata may be provided to an audio decoder in the signal processor of FIG. 12E to adapt processing parameters for the audio decoder. The processing state metadata may include a description of media features, media class types or subtypes, or likelihood/probability values, as determined by one or more media processing units prior to the signal processor of FIG. 12E, which the signal processor of FIG. 12E may be configured to use without performing its own media content analysis. Additionally, optionally, or alternatively, the media state metadata extractor may be configured to extract 3$^{rd}$ party data from the input signal and transmit the 3$^{rd}$ party data to a downstream processing node/entity/device. In an embodiment, the audio decoder processes the coded audio bitstream into audio PCM samples an output signal based on the processing parameters set based on the processing state metadata provided by the one or more media processing units prior to the signal processor of FIG. 12E.

Figure 12F:
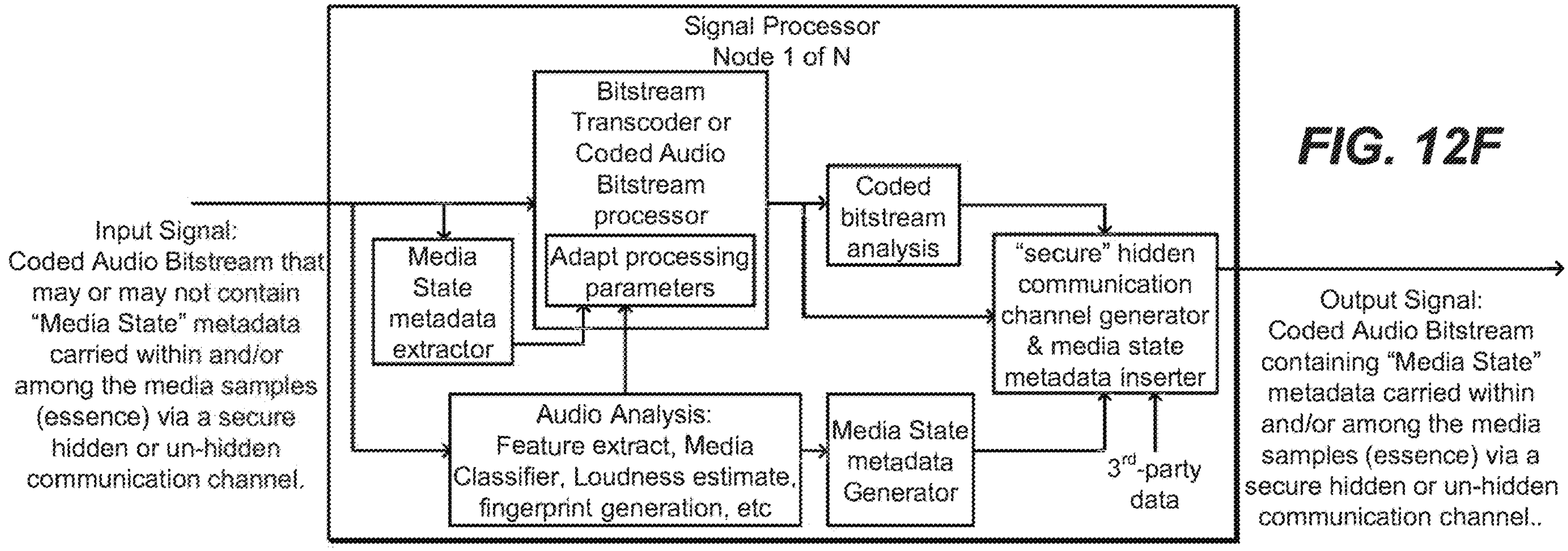

As illustrated in FIG. 12F, a signal processor (which may be Node 1 of N nodes) is configured to receive a input signal, which may comprise a coded audio bitstream containing processing state metadata (or media state metadata) carried within and/or hidden among the media samples via a secure hidden or un-hidden communication channel. The signal processor of FIG. 12F may comprise a media state metadata extractor that is configured to decode, extract, and/or interpret the processing state metadata from the coded bitstream, as provided by one or more media processing units prior to the signal processor of FIG. 12F. At least a part of the processing state metadata may be provided to a bitstream transcoder (or coded audio bitstream processor) in the signal processor of FIG. 12F to adapt processing parameters for the bitstream transcoder. In parallel, an audio analysis unit in the signal processor of FIG. 12F may analyze the media content passed in the input signal. Feature extraction, media classification, loudness estimate, fingerprint generation, etc., may be implemented as a part of the analysis performed by the audio analysis unit. At least a part of the results of this analysis may be provided to the bitstream transcoder in the signal processor of FIG. 12F to adapt processing parameters for the bitstream transcoder. The bitstream transcoder transforms the coded audio bitstream in the input signal into a coded audio bitstream in an output signal based on the processing parameters. A coded bitstream analysis unit in the signal processor of FIG. 12F may be configured to determine whether the media data or samples in the coded audio bitstream has room to store at least a portion of processing state metadata. The new processing state metadata to be transmitted by the signal processor of FIG. 12F comprise some or all of the processing state metadata that was extracted by the media state metadata extractor, the processing state metadata that was generated by the audio analysis unit and a media state metadata generator of the signal processor of FIG. 12F, and/or any 3$^{rd}$ party data. If it is determined that the media data or samples in the coded audio bitstream have room to store at least a portion of processing state metadata, a part or all of the new processing state metadata may be stored as hidden data in the media data or samples in the output signal. Additionally, optionally, or alternatively, a part or all of the new processing state metadata may be stored in separate metadata structure apart from the media data, in the output signal. Thus, the output signal may comprise a coded audio bitstream containing processing state (or "media state") metadata carried within and/or among the media data/samples (essence) via a secure hidden or un-hidden communication channel.

Figure 12G:
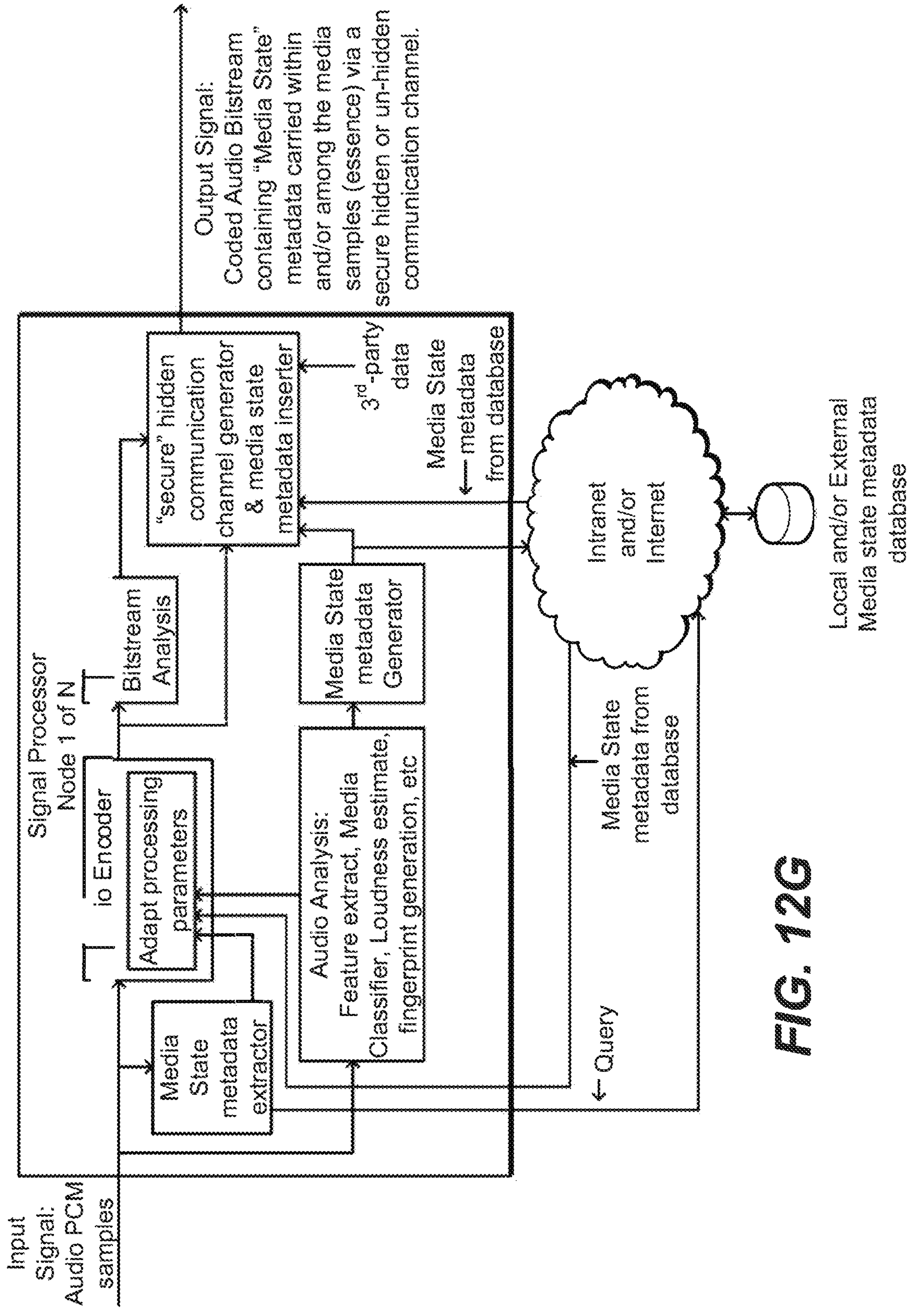

FIG. 12G illustrates an example configuration similar to that of FIG. 12A in part. Additionally, optionally, or alternatively, a signal processor of FIG. 12G may comprise a media state metadata extractor that is configured to query a local and/or external media state metadata database, which may be operatively linked to the signal processor of FIG. 12G through intranet and/or the internet. A query sent by the signal processor of FIG. 12G to the database may include one or more fingerprints associated with the media data, one or more names associated with the media data (e.g., a song title, a movie title), or any other types of identifying information associated with media data. Based on the information in the query, matched media state metadata stored in the database may be located and provided to the signal process of FIG. 12G. The media state metadata may be included in processing state metadata provided by the media state metadata extractor to downstream processing nodes/entities such as an audio encoder. Additionally, optionally, or alternatively, the signal processor of FIG. 12G may comprise a media state metadata generator that is configured to provide any generated media state metadata and/or associated identifying information such as fingerprints, names, and/or other types of identifying information to a local and/or external media state metadata database, as illustrated in FIG. 12G. Additionally, optionally, or alternatively, one or more portions of media state metadata stored in the database may be provided to the signal process of FIG. 12G to be communicated to a downstream media processing node/device within and/or among media samples (essence) via a secure hidden or un-hidden communication channel.

Figure 12H:
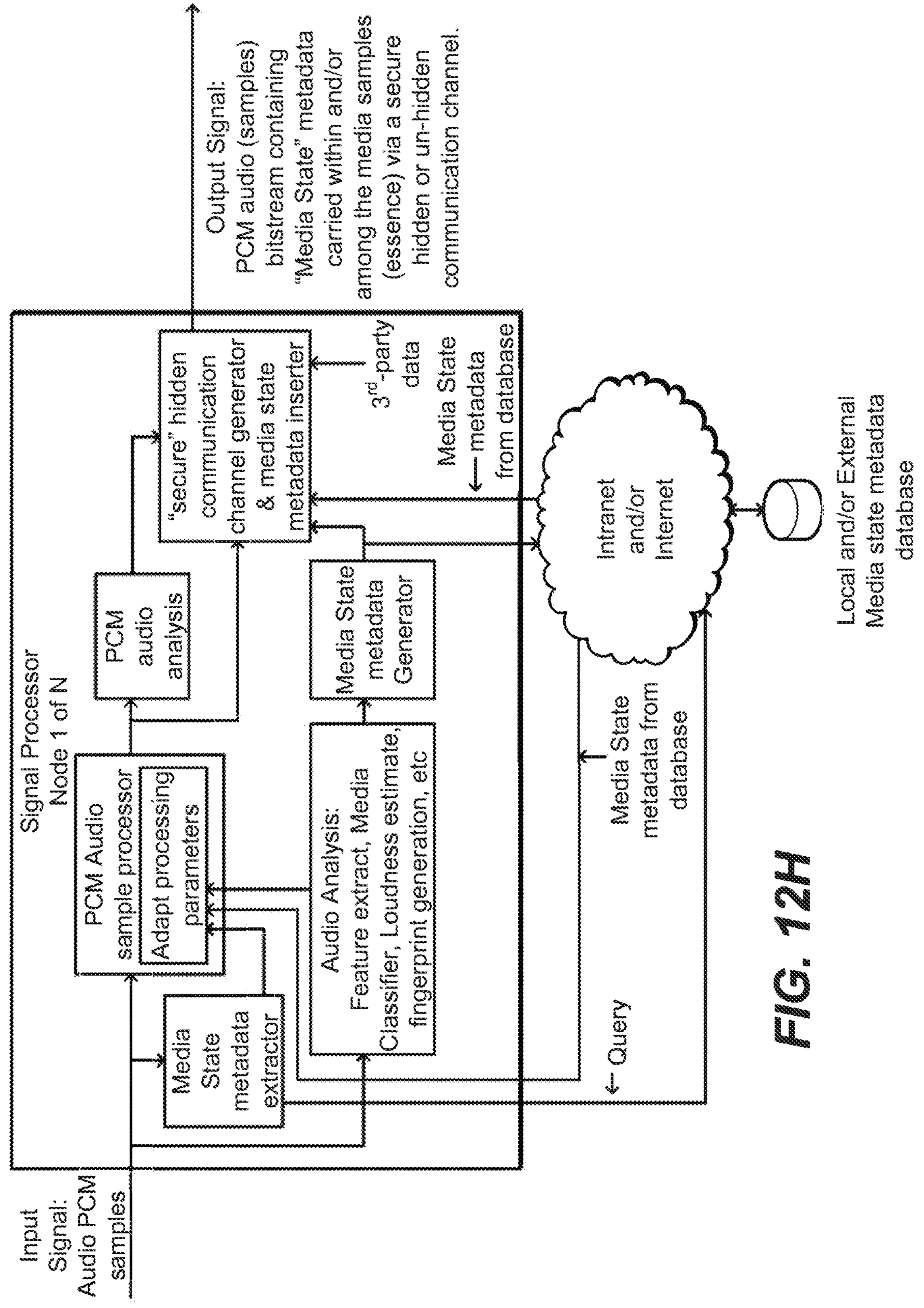

FIG. 12H illustrates an example configuration similar to that of FIG. 12B in part. Additionally, optionally, or alternatively, a signal processor of FIG. 12H may comprise a media state metadata extractor that is configured to query a local and/or external media state metadata database, which may be operatively linked to the signal processor of FIG. 12H through intranet and/or the internet. A query sent by the signal processor of FIG. 12H to the database may include one or more fingerprints associated with the media data, one or more names associated with the media data (e.g., a song title, a movie title), or any other types of identifying information associated with media data. Based on the information in the query, matched media state metadata stored in the database may be located and provided to the signal process of FIG. 12H. The media state metadata may be included in processing state metadata provided by the media state metadata extractor to downstream processing nodes/entities such as a PCM audio sample processor. Additionally, optionally, or alternatively, the signal processor of FIG. 12H may comprise a media state metadata generator that is configured to provide any generated media state metadata and/or associated identifying information such as fingerprints, names, and/or other types of identifying information to a local and/or external media state metadata database, as illustrated in FIG. 12H. Additionally, optionally, or alternatively, one or more portions of media state metadata stored in the database may be provided to the signal process of FIG. 12H to be communicated to a downstream media processing node/device within and/or among media samples (essence) via a secure hidden or un-hidden communication channel.

Figure 12I:
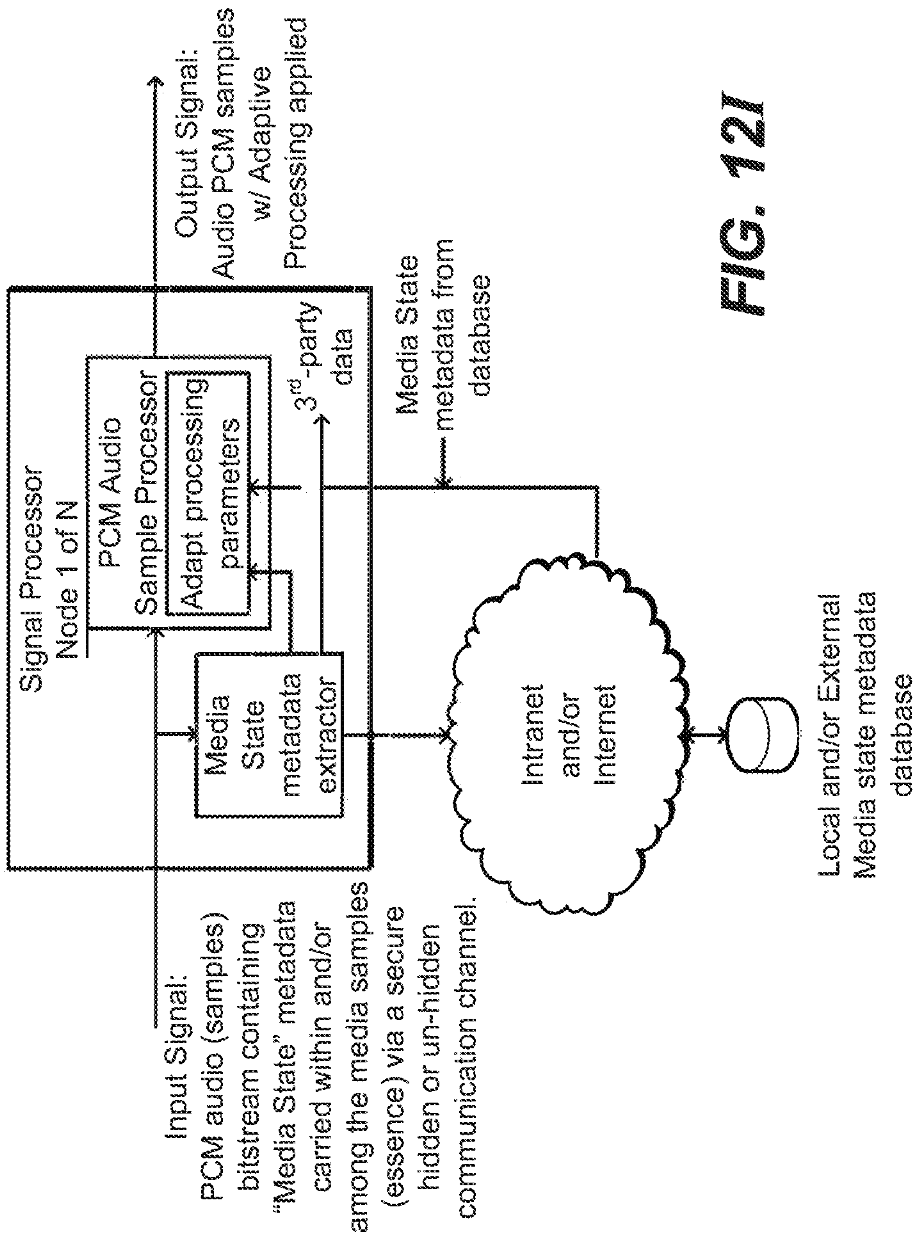

FIG. 12I illustrates an example configuration similar to that of FIG. 12C in part. Additionally, optionally, or alternatively, a signal processor of FIG. 12I may comprise a media state metadata extractor that is configured to query a local and/or external media state metadata database, which may be operatively linked to the signal processor of FIG. 12I through intranet and/or the internet. A query sent by the signal processor of FIG. 12I to the database may include one or more fingerprints associated with the media data, one or more names associated with the media data (e.g., a song title, a movie title), or any other types of identifying information associated with media data. Based on the information in the query, matched media state metadata stored in the database may be located and provided to the signal process of FIG. 12I. The media state metadata may be provided to downstream processing nodes/entities such as a PCM audio sample processor.

Figure 12J:
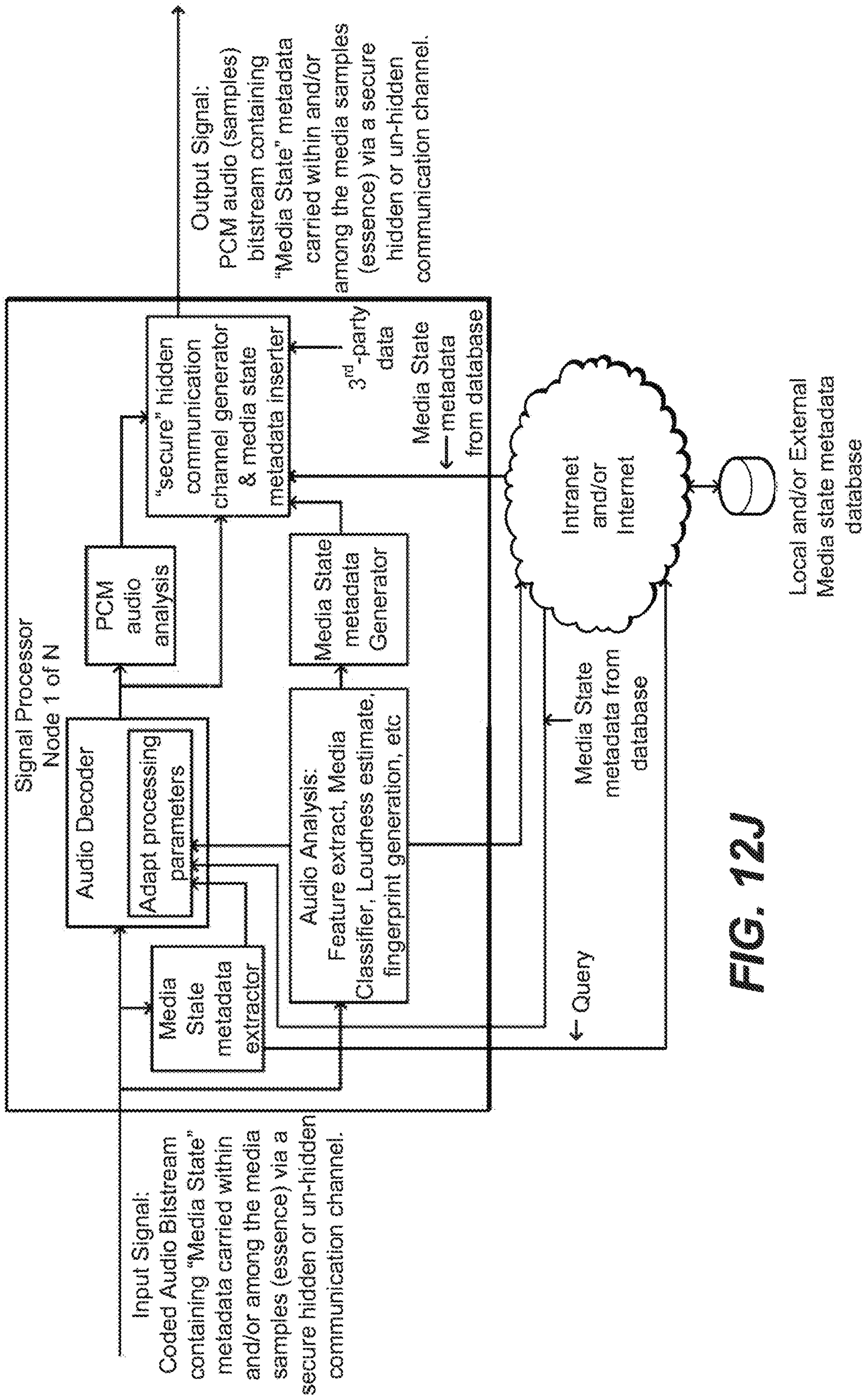

FIG. 12J illustrates an example configuration similar to that of FIG. 12D in part. Additionally, optionally, or alternatively, a signal processor of FIG. 12J may comprise a media state metadata extractor that is configured to query a local and/or external media state metadata database, which may be operatively linked to the signal processor of FIG. 12J through intranet and/or the internet. A query sent by the signal processor of FIG. 12J to the database may include one or more fingerprints associated with the media data, one or more names associated with the media data (e.g., a song title, a movie title), or any other types of identifying information associated with media data. Based on the information in the query, matched media state metadata stored in the database may be located and provided to the signal process of FIG. 12J. The media state metadata from the database may be included in processing state metadata provided to downstream processing nodes/entities such as an audio decoder. Additionally, optionally, or alternatively, the signal processor of FIG. 12J may comprise an audio analysis unit that is configured to provide any generated media state metadata and/or associated identifying information such as fingerprints, names, and/or other types of identifying information to a local and/or external media state metadata database, as illustrated in FIG. 12J. Additionally, optionally, or alternatively, one or more portions of media state metadata stored in the database may be provided to the signal process of FIG. 12J to be communicated to a downstream media processing node/device within and/or among media samples (essence) via a secure hidden or un-hidden communication channel.

Figure 12K:
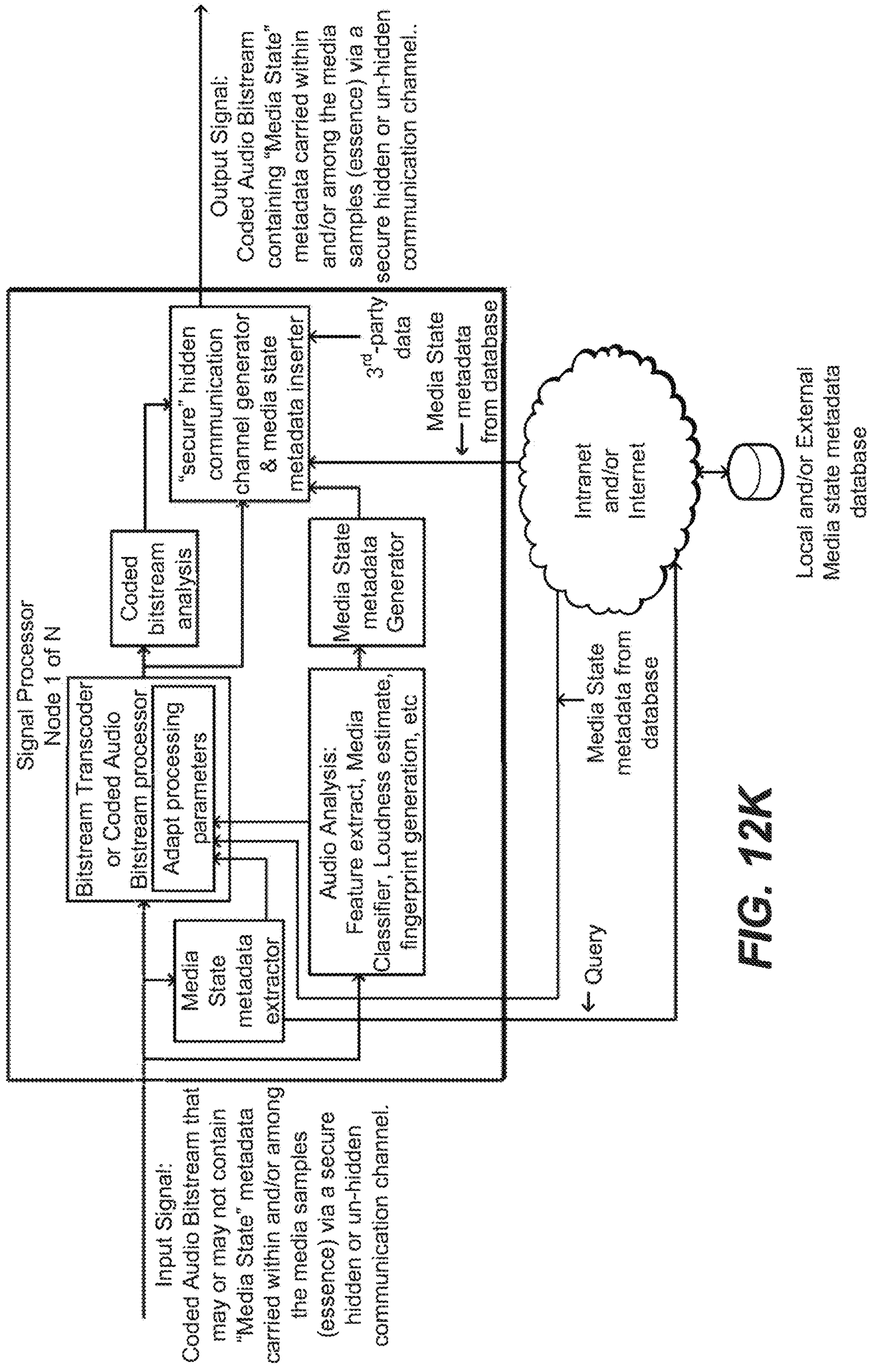

FIG. 12K illustrates an example configuration similar to that of FIG. 12F in part. Additionally, optionally, or alternatively, a signal processor of FIG. 12K may comprise a media state metadata extractor that is configured to query a local and/or external media state metadata database, which may be operatively linked to the signal processor of FIG. 12K through intranet and/or the internet. A query sent by the signal processor of FIG. 12K to the database may include one or more fingerprints associated with the media data, one or more names associated with the media data (e.g., a song title, a movie title), or any other types of identifying information associated with media data. Based on the information in the query, matched media state metadata stored in the database may be located and provided to the signal process of FIG. 12K. The media state metadata from the database may be included in processing state metadata provided to downstream processing nodes/entities such as a bitstream transcoder or coded audio bitstream processor. Additionally, optionally, or alternatively, one or more portions of media state metadata stored in the database may be provided to the signal process of FIG. 12K to be communicated to a downstream media processing node/device within and/or among media samples (essence) via a secure hidden or un-hidden communication channel.

Figures 1, 12L:
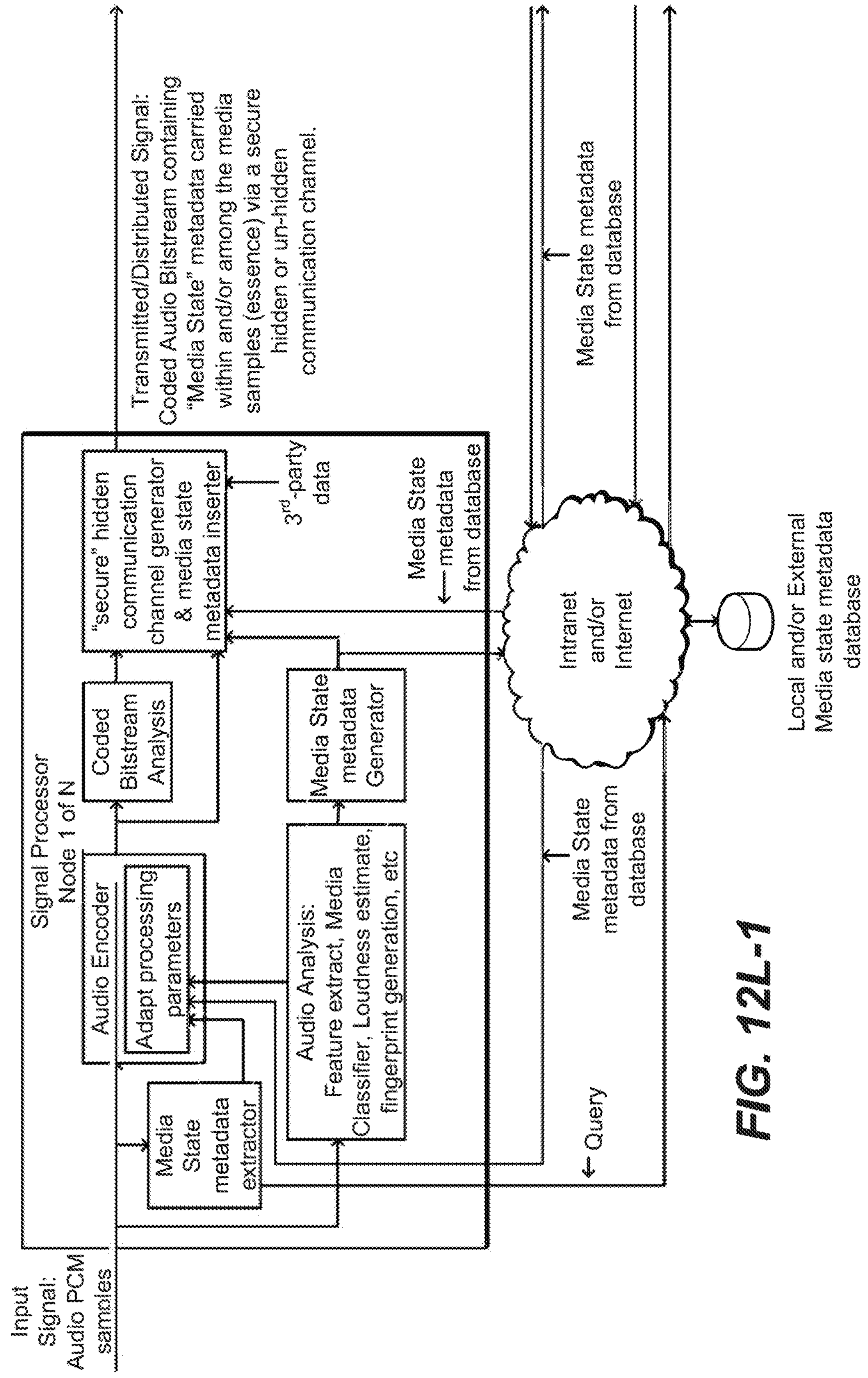
Figures 2, 12L:
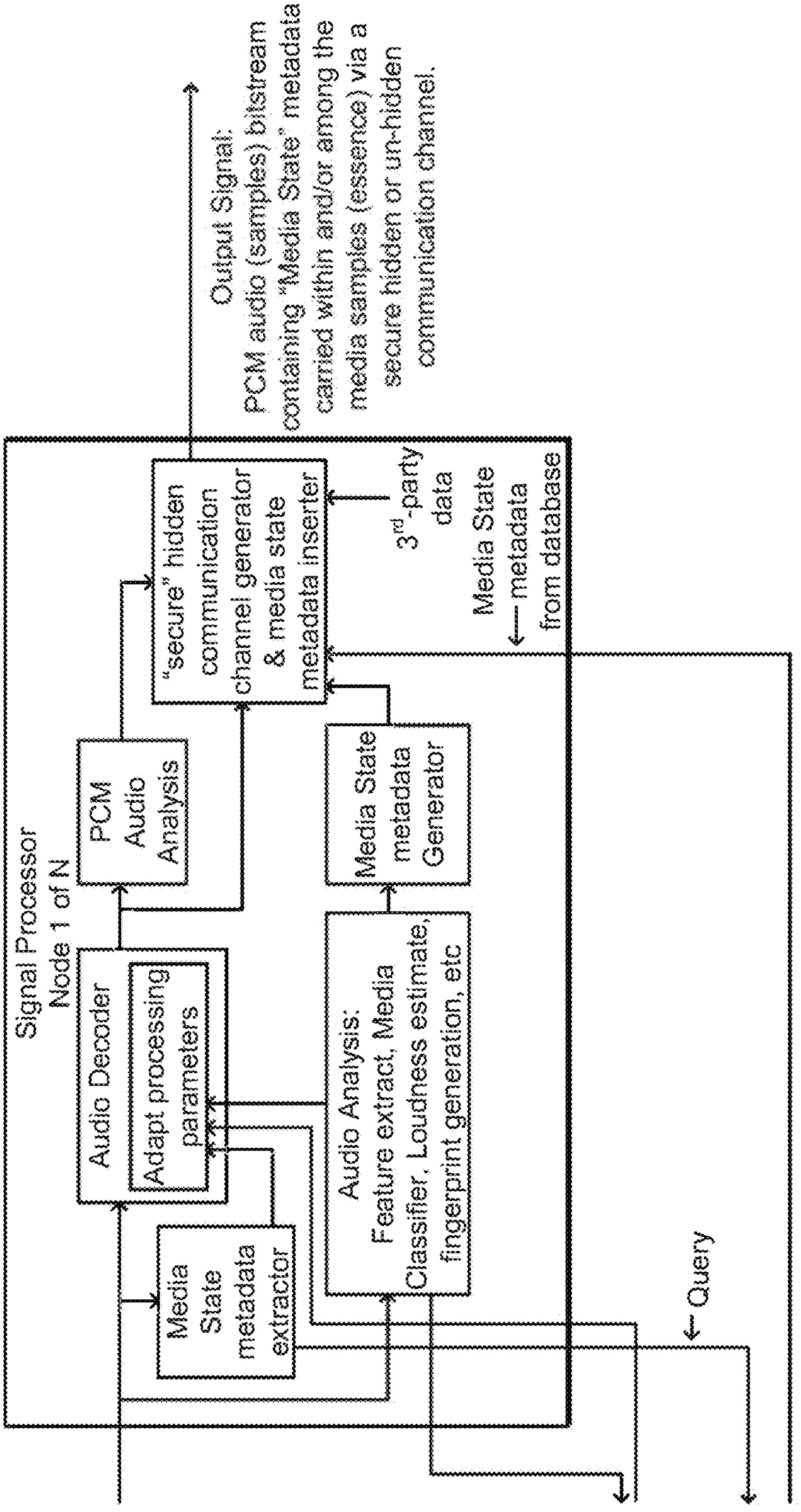
Figure 12L:
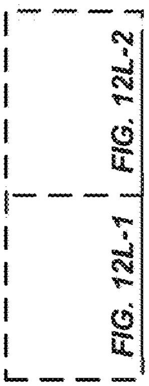

FIG. 12L illustrates a signal processor node 1 and a signal processor node 2, in accordance with an example embodiment. Signal processor node 1 and signal processor node 2 may be a part of an overall media processing chain. In some embodiments, signal processor node 1 adapts media processing based on processing state metadata which is received by signal processor node 2, while signal processor node 2 adapts media processing based on processing state metadata which is received by signal processor node 2. The processing state metadata received by signal processor node 2 may comprise processing state metadata and/or media state metadata added by signal processor node 1 after signal processor node 1 analyzes the content of media data; as a result, signal processor node 2 may directly make use of the metadata provided by the signal processor node 1 in media processing without repeating some or all of the analysis previously performed by signal processor node 1.

7. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
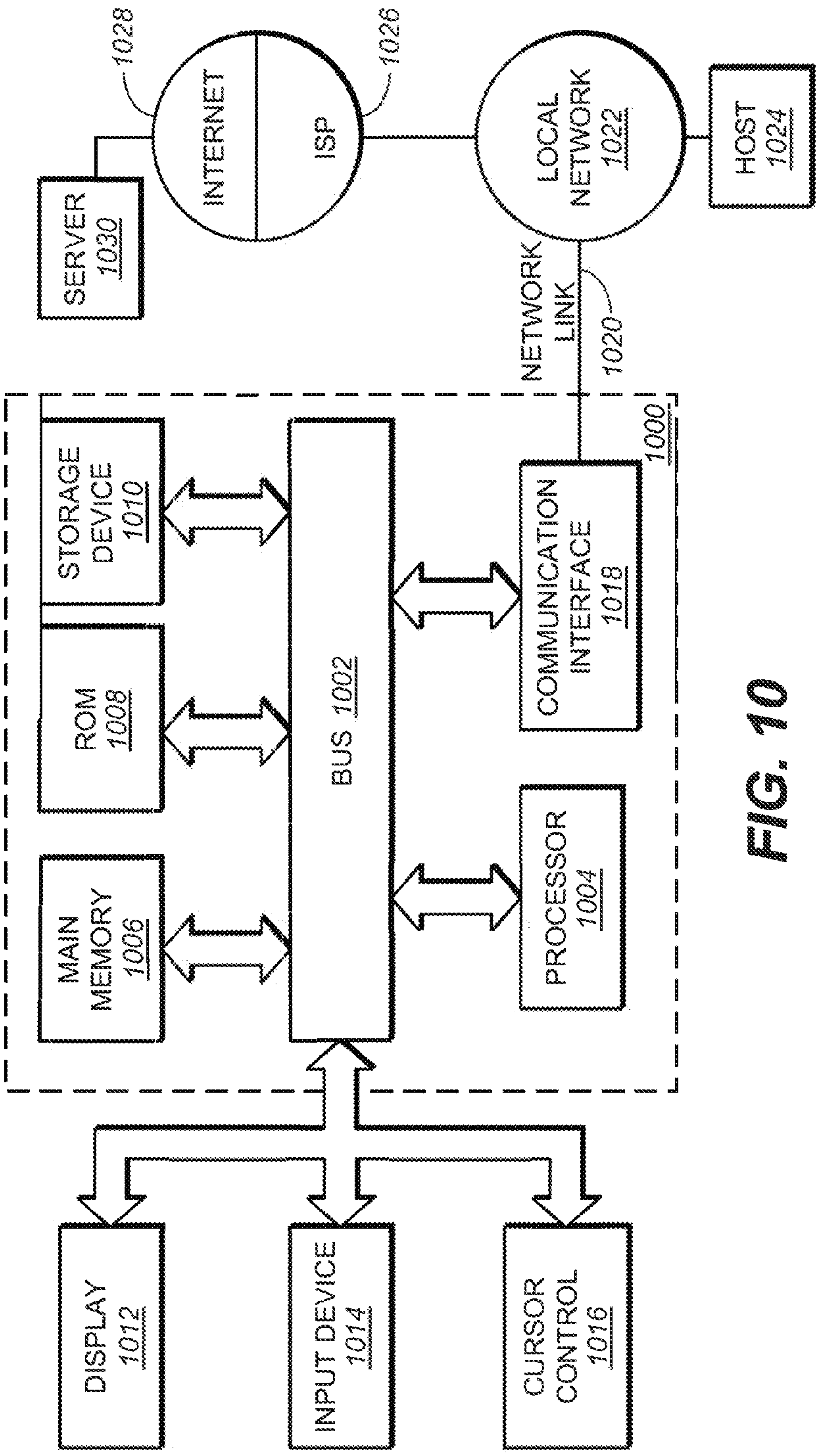
FIG. 10 illustrates an example hardware platform on which a computer or a computing device as described herein may be implemented, according a possible embodiment of the present invention.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface

1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8. ENUMERATED EXAMPLE EMBODIMENTS

Thus, embodiments of the present invention may relate to one or more of the enumerated example embodiments below, each of which are examples, and, as with any other related discussion provided above, should not be construed as limiting any claim or claims provided yet further below as they stand now or as later amended, replaced, or added. Likewise, these examples should not be considered as limiting with respect to any claim or claims of any related patents and/or patent applications (including any foreign or international counterpart applications and/or patents, divisionals, continuations, re-issues, etc.).

Enumerated example embodiment 1 is a method comprising: determining, by a first device in a media processing chain, whether a type of media processing has been performed on an output version of media data; in response to determining, by the first device, that the type of media processing has been performed on the output version of the media data, performing: (a) creating, by the first device, a state of the media data, the state specifying the type of media processing performed on the output version of the media data, and (b) communicating, from the first device to a second device downstream in the media processing chain, the output version of the media data and the state of the media data.

Enumerated example embodiment 2 is a method as described in enumerated example embodiment 1, wherein the media data comprises media content as one or more of: audio content only, video content only, or both audio content and video content.

Enumerated example embodiment 3 is a method as described in enumerated example embodiment 1, further comprising providing, to the second device, the state of the media data as one or more of: (a) media fingerprints, (b) processing state metadata, (c) extracted media feature values, (d) media class types or sub-type description(s) and/or values (e) media feature class and/or sub-class probability values, (f) cryptographic hash value or (f) media processing signaling.

Enumerated example embodiment 4 is a method as described in enumerated example embodiment 1, further comprising: storing a media processing data block at a media processing database, wherein the media processing data block comprises media processing metadata, and wherein the media processing data block is retrievable based on one or more media fingerprints that are associated with the media processing data block.

Enumerated example embodiment 5 is a method as described in enumerated example embodiment 1, wherein the state of media data comprises a cryptographic hash value encrypted with credential information, and wherein the cryptographic hash value is to be authenticated by a recipient device.

Enumerated example embodiment 6 is a method as described in enumerated example embodiment 1, wherein at least a portion of the state of media data comprises one or more secure communication channels hidden in the media data, and wherein the one or more secure communication channels are to be authenticated by a recipient device.

Enumerated example embodiment 7 is a method as described in enumerated example embodiment 6, wherein the one or more secure communication channels comprise at least one spread spectrum secure communication channel.

Enumerated example embodiment 8 is a method as described in enumerated example embodiment 6, wherein the one or more secure communication channels comprise at least one frequency shift keying secure communication channel.

Enumerated example embodiment 9 is a method as described in enumerated example embodiment 1, wherein the state of the media data is carried with the output version of the media data in an output media bitstream.

Enumerated example embodiment 10 is a method as described in enumerated example embodiment 1, wherein the state of the media data is carried in an auxiliary metadata bitstream associated with a separate media bitstream that carries the output version of the media data.

Enumerated example embodiment 11 is a method as described in enumerated example embodiment 1, wherein the state of the media data comprises one or more sets of parameters that relate to the type of media processing.

Enumerated example embodiment 12 is a method as described in enumerated example embodiment 1, wherein at least one of the first device or the second device comprises one or more of: pre-processing units, encoders, media processing sub-units, transcoders, decoders, post-processing units, or media content rendering sub-units.

Enumerated example embodiment 13 is a method as described in enumerated example embodiment 1, wherein the first device is an encoder, and wherein the second device is a decoder.

Enumerated example embodiment 14 is a method as described in enumerated example embodiment 1, further comprising performing, by the first device, the type of media processing.

Enumerated example embodiment 15 is a method as described in enumerated example embodiment 1, wherein the type of media processing was performed by an upstream device, relative to the first device, in the media processing chain; and further comprising: receiving, by the first device, an input version of the media data, wherein the input version of the media data comprises any state of the media data that indicates the type of media processing; analyzing the input version of the media data to determine the type of media processing already been performed on the input version of the media data.

Enumerated example embodiment 16 is a method as described in enumerated example embodiment 1, further comprising: encoding loudness and dynamic range values in the state of media data.

Enumerated example embodiment 17 is a method as described in enumerated example embodiment 1, wherein the type of media processing was previously performed by an upstream device, relative to the first device, in the media processing chain; and further comprising: receiving, by the first device, a command to override the type of media processing previously performed; performing, by the first device, the type of media processing; communicating, from the first device to a second device downstream in the media processing chain, an output version of the media data and a state of the media data that indicates that the type of media processing has already been performed in the output version of the media data.

Enumerated example embodiment 18 is a method as described in enumerated example embodiment 17, further comprising receiving the command from one of: (a) user input, (b) a system configuration of the first device, (c) signaling from a device external to the first device, or (d) signaling from a sub-unit within the first device.

Enumerated example embodiment 19 is a method as described in enumerated example embodiment 1, further comprising communicating, from the first device to the second device downstream in the media processing chain, one or more types of metadata independent of the state of the media data.

Enumerated example embodiment 20 is a method as described in enumerated example embodiment 1, wherein the state of the media data comprises at least a portion of state metadata hidden in one or more secure communication channels.

Enumerated example embodiment 21 is a method as described in enumerated example embodiment 1, further comprising altering a plurality of bytes in the media data to store at least a portion of the state of the media data.

Enumerated example embodiment 22 is a method as described in enumerated example embodiment 1, wherein at least one of the first device and the second device comprises one or more of Advanced Television Systems Committee (ATSC) codecs, Moving Picture Experts Group (MPEG) codecs, Audio Codec 3 (AC-3) codecs, and Enhanced AC-3 codecs.

Enumerated example embodiment 23 is a method as described in enumerated example embodiment 1, wherein the media processing chain comprises: a pre-processing unit configured to accept time-domain samples comprising media content as input and to output processed time-domain samples; an encoder configured to output compressed media bitstream of the media content based on the processed time-domain samples; a signal analysis and metadata correction unit configured to validate processing state metadata in the compressed media bitstream; a transcoder configured to modify the compressed media bitstream; a decoder configured to output decoded time-domain samples based on the compressed media bitstream; and a post-processing unit configured to perform post-processing of the media content in the decoded time-domain samples.

Enumerated example embodiment 24 is a method as described in enumerated example embodiment 23, wherein at least one of the first device and the second device comprises one or more of the pre-processing unit, the signal analysis and metadata correction unit, the transcoder, the decoder, and the post-processing unit.

Enumerated example embodiment 25 is a method as described in enumerated example embodiment 23, wherein at least one of the pre-processing unit, the signal analysis and metadata correction unit, the transcoder, the decoder, and the post-processing unit performs adaptive processing of the media content based on processing metadata received from an upstream device.

Enumerated example embodiment 26 is a method as described in enumerated example embodiment 1, further comprising determining one or more media features from the media data; including a description of the one or more media features in the state of media data.

Enumerated example embodiment 27 is a method as described in enumerated example embodiment 26, wherein the one or more media features comprise at least one media feature determined from one or more of frames, seconds, minutes, user-definable time intervals, scenes, songs, music pieces, and recordings.

Enumerated example embodiment 28 is a method as described in enumerated example embodiment 26, the one or more media features comprise a semantic description of the media data.

Enumerated example embodiment 29 is a method as described in enumerated example embodiment 26, the one or more media features comprise one or more of structural properties, tonality including harmony and melody, timbre, rhythm, loudness, stereo mix, a quantity of sound sources of the media data, absence or presence of voice, repetition characteristics, melody, harmonies, lyrics, timbre, perceptual features, digital media features, stereo parameters, one or more portions of speech content.

Enumerated example embodiment 30 is a method as described in enumerated example embodiment 26, further comprising using the one or more media features to classify the media data into one or more media data classes in a plurality of media data classes.

Enumerated example embodiment 31 is a method as described in enumerated example embodiment 30, wherein the one or more media data classes comprises one or more of a single overall/dominant media data class for an entire piece of media, or a single class that represents a smaller time period than the entire piece of media.

Enumerated example embodiment 32 is a method as described in enumerated example embodiment 31, wherein the smaller time period represents one or more of a single media frame, a single media data block, multiple media frames, multiple media data blocks, a fraction of second, a second, or multiple seconds.

Enumerated example embodiment 33 is a method as described in enumerated example embodiment 30, wherein one or more media data class labels representing the one or more media data classes are computed and inserted into a bitstream.

Enumerated example embodiment 34 is a method as described in enumerated example embodiment 30, wherein one or more media data class labels representing the one or more media data classes are computed and signaled to a recipient media processing node as hidden data embedded with the media data.

Enumerated example embodiment 35 is a method as described in enumerated example embodiment 30, wherein one or more media data class labels representing the one or more media data classes are computed and signaled to a recipient media processing node in a separate metadata structure between blocks of the media data.

Enumerated example embodiment 36 is a method as described in enumerated example embodiment 31, wherein the single overall/dominant media data class represents one or more of a single class type such as music, speech, noise, silence, applause, or a mixture class type such as speech over music, conversation over noise, or other mixtures of media data types.

Enumerated example embodiment 37 is a method as described in enumerated example embodiment 30, further comprising associating one or more likelihood or probability values with the one or more media data class labels, wherein a likelihood or probability value represents a level of confidence that a computed media class label has relative to a media segment/block to which the computed media class label is associated.

Enumerated example embodiment 38 is a method as described in enumerated example embodiment 37, wherein the likelihood or probability value is used by a recipient media processing node in the media processing chain to adapt processing in a manner to improve one or more operations such as upmixing, encoding, decoding, transcoding, or headphone virtualization.

Enumerated example embodiment 39 is a method as described in enumerated example embodiment 38, wherein at least one of the one or more operations eliminates a need for preset processing parameters, reduces complexity of processing units throughout the media chain, or increases battery life, as complex analysis operations to classify the media data by the recipient media processing node are avoided.

Enumerated example embodiment 40 is a method comprising: determining, by a first device in a media processing chain, whether a type of media processing has already been performed on an input version of media data; in response to determining, by the first device, that the type of media processing has already been performed on the input version of the media data, performing adapting processing of the media data to disable performing the type of media processing in the first device; wherein the method is performed by one or more computing processors.

Enumerated example embodiment 41 is a method as described in enumerated example embodiment 40, further comprising: communicating, from the first device to a second device downstream in the media processing chain, an output version of the media data and a state of the media data that indicates that the type of media processing has been performed in the output version of the media data.

Enumerated example embodiment 42 is a method as described in enumerated example embodiment 41, further comprising encoding loudness and dynamic range values in the state of media data.

Enumerated example embodiment 43 is a method as described in enumerated example embodiment 40, further comprising: performing, by the first device, a second type of media processing on the media data, the second type of media processing different from the type of media processing; communicating, from the first device to a second device downstream in the media processing chain, an output version of the media data and a state of the media data that indicates that the type of media processing and the second type of media processing have already been performed in the output version of the media data.

Enumerated example embodiment 44 is a method as described in enumerated example embodiment 40, further comprising: automatically performing one or more of adapting corrective loudness or dynamics audio processing based at least in part on whether the type of processing has previously been performed on the input version of the media data.

Enumerated example embodiment 45 is a method as described in enumerated example embodiment 40, further comprising: extracting an input state of the media data from data units in the media data that encode media content, wherein the input state of the media data is hidden in one or more of the data units.

Enumerated example embodiment 46 is a method as described in enumerated example embodiment 45, further comprising recovering a version of the data units that do not comprise the input state of the media data and rendering the media content based on the version of the data units that have been recovered.

Enumerated example embodiment 47 is a method as described in enumerated example embodiment 46, further comprising retrieving an input state of the media data that is associated with the input version of the media data.

Enumerated example embodiment 48 is a method as described in enumerated example embodiment 47, further comprising authenticating the input state of media data by validating a cryptographic hash value associated with the input state of the media data.

Enumerated example embodiment 49 is a method as described in enumerated example embodiment 47, further comprising authenticating the input state of media data by validating one or more fingerprints associated with the input state of the media data, wherein at least one of the one or more fingerprints is generated based on at least a portion of the media data.

Enumerated example embodiment 50 is a method as described in enumerated example embodiment 47, further comprising validating the media data by validating one or more fingerprints associated with the input state of the media data, wherein at least one of the one or more fingerprints is generated based on at least a portion of the media data.

Enumerated example embodiment 51 is a method as described in enumerated example embodiment 47, wherein the input state of the media data is carried with the input version of the media data in an input media bitstream.

Enumerated example embodiment 52 is a method as described in enumerated example embodiment 47, further comprising: turning off one or more types of media processing based on the input state of the media data.

Enumerated example embodiment 53 is a method as described in enumerated example embodiment 47, wherein the input state of the media data is described with processing state metadata; and further comprising: creating media processing signaling based at least in part on the processing state metadata, wherein the media processing signaling indicates the input state of the media data; transmitting the media processing signaling to a media processing device downstream to the first device in the media processing chain.

Enumerated example embodiment 54 is a method as described in enumerated example embodiment 53, wherein the media processing signaling is hidden in one or more data units in an output version of the media data.

Enumerated example embodiment 55 is a method as described in enumerated example embodiment 54, wherein the media processing signaling is performed using a reversible data hiding technique such that one or more modifications to the media data are removable by a recipient device.

Enumerated example embodiment 56 is a method as described in enumerated example embodiment 54, wherein the media processing signaling is performed using an irreversible data hiding technique such that at least one of one or more modifications to the media data is not removable by a recipient device.

Enumerated example embodiment 57 is a method as described in enumerated example embodiment 46, further comprising receiving, from an upstream device in the media processing chain, one or more types of metadata independent of any past media processing performed on the media data.

Enumerated example embodiment 58 is a method as described in enumerated example embodiment 47, wherein the state of the media data comprises at least a portion of state metadata hidden in one or more secure communication channels.

Enumerated example embodiment 59 is a method as described in enumerated example embodiment 46, further comprising altering a plurality of bytes in the media data to store at least a portion of a state of the media data.

Enumerated example embodiment 60 is a method as described in enumerated example embodiment 46, wherein the first device comprises one or more of Advanced Television Systems Committee (ATSC) codecs, Moving Picture Experts Group (MPEG) codecs, Audio Codec 3 (AC-3) codecs, and Enhanced AC-3 codecs.

Enumerated example embodiment 61 is a method as described in enumerated example embodiment 46, wherein the media processing chain comprises: a pre-processing unit configured to accept time-domain samples comprising media content as input and to output processed time-domain samples; an encoder configured to output compressed media bitstream of the media content based on the processed time-domain samples; a signal analysis and metadata correction unit configured to validate processing state metadata in the compressed media bitstream; a transcoder configured to modify the compressed media bitstream; a decoder configured to output decoded time-domain samples based on the compressed media bitstream; and a post-processing unit configured to perform post-processing of the media content in the decoded time-domain samples.

Enumerated example embodiment 62 is a method as described in enumerated example embodiment 61, wherein the first device comprises one or more of the pre-processing unit, the signal analysis and metadata correction unit, the transcoder, the decoder, and the post-processing unit.

Enumerated example embodiment 63 is a method as described in enumerated example embodiment 61, wherein at least one of the pre-processing unit, the signal analysis and metadata correction unit, the transcoder, the decoder, and the post-processing unit performs adaptive processing of the media content based on processing metadata received from an upstream device.

Enumerated example embodiment 64 is a method as described in enumerated example embodiment 47, further comprising determining one or more media features based on a description of the one or more media features in the state of media data.

Enumerated example embodiment 65 is a method as described in enumerated example embodiment 64, wherein the one or more media features comprise at least one media feature determined from one or more of frames, seconds, minutes, user-definable time intervals, scenes, songs, music pieces, and recordings.

Enumerated example embodiment 66 is a method as described in enumerated example embodiment 64, the one or more media features comprise a semantic description of the media data.

Enumerated example embodiment 67 is a method as described in enumerated example embodiment 64, further comprising performing one or more specific operations in response to determining the one or more media features.

Enumerated example embodiment 68 is a method as described in enumerated example embodiment 43, further comprising providing, to the second device in the media processing chain, the state of the media data as one or more of: (a) media fingerprints, (b) processing state metadata, (c) extracted media feature values, (d) media class types or sub-type description(s) and/or values (e) media feature class and/or sub-class probability values, (f) cryptographic hash value or (f) media processing signaling.

Enumerated example embodiment 69 is a method comprising: computing, with a first device in a media processing chain, one or more data rate reduced representations of a source frame of media data; and carrying the one or more data rate reduced representations simultaneously and securely, within a state of the media data itself, to a second device in the media processing chain; wherein the method is performed by one or more computing devices.

Enumerated example embodiment 70 is a method as described in enumerated example embodiment 69, wherein the one or more data rate reduced representations are carried in at least one of a sub-stream, one or more reserved fields, an add_bsi field, one or more auxiliary data fields, or one or more transform coefficients.

Enumerated example embodiment 71 is a method as described in enumerated example embodiment 69, wherein the one or more data rate reduced representations comprise synchronization data used for synchronizing audio and video delivered within the media data.

Enumerated example embodiment 72 is a method as described in enumerated example embodiment 69, wherein the one or more data rate reduced representations comprise media fingerprints (a) generated by a media processing unit and (b) embedded with the media data for one or more of quality monitoring, media ratings, media tracking, or content search.

Enumerated example embodiment 73 is a method as described in enumerated example embodiment 69, wherein at least one of the one or more data rate reduced representations comprises at least a portion of state metadata hidden in one or more secure communication channels.

Enumerated example embodiment 74 is a method as described in enumerated example embodiment 69, further comprising altering a plurality of bytes in the media data to store at least a portion of one of the one or more data rate reduced representations.

Enumerated example embodiment 75 is a method as described in enumerated example embodiment 69, wherein at least one of the first device and the second device comprises one or more of Advanced Television Systems Committee (ATSC) codecs, Moving Picture Experts Group (MPEG) codecs, Audio Codec 3 (AC-3) codecs, and Enhanced AC-3 codecs.

Enumerated example embodiment 76 is a method as described in enumerated example embodiment 69, wherein the media processing chain comprises: a pre-processing unit configured to accept time-domain samples comprising media content as input and to output processed time-domain samples; an encoder configured to output compressed media bitstream of the media content based on the processed time-domain samples; a signal analysis and metadata correction unit configured to validate processing state metadata in the compressed media bitstream; a transcoder configured to modify the compressed media bitstream; a decoder configured to output decoded time-domain samples based on the compressed media bitstream; and a post-processing unit configured to perform post-processing of the media content in the decoded time-domain samples.

Enumerated example embodiment 77 is a method as described in enumerated example embodiment 76, wherein at least one of the first device and the second device comprises one or more of the pre-processing unit, the signal analysis and metadata correction unit, the transcoder, the decoder, and the post-processing unit.

Enumerated example embodiment 78 is a method as described in enumerated example embodiment 76, wherein at least one of the pre-processing unit, the signal analysis and metadata correction unit, the transcoder, the decoder, and the post-processing unit performs adaptive processing of the media content based on processing metadata received from an upstream device.

Enumerated example embodiment 79 is a method as described in enumerated example embodiment 69, further comprising providing, to the second device, the state of the media data as one or more of: (a) media fingerprints, (b) processing state metadata, (c) extracted media feature values, (d) media class types or sub-type description(s) and/or values (e) media feature class and/or sub-class probability values, (f) cryptographic hash value or (f) media processing signaling.

Enumerated example embodiment 80 is a method comprising: adaptively processing, with one or more computing devices in a media processing chain comprising one or more of psychoacoustic units, transforms, waveform/spatial audio coding units, encoders, decoders, transcoders, or stream processors, an input version of media data based on a past history of loudness processing of the media data by one or more upstream media processing units as indicated by a state of the media data; normalizing loudness and/or dynamic range of an output version of the media data at an end of the media processing chain to consistent loudness and/or dynamic range values.

Enumerated example embodiment 81 is a method as described in enumerated example embodiment 80, wherein the consistent loudness value comprises a loudness value of (1) controlled or selected by a user or (2) adaptively signaled by a state in the input version of the media data.

Enumerated example embodiment 82 is a method as described in enumerated example embodiment 80, wherein the loudness value is computed on the dialogue (speech) portions of the media data.

Enumerated example embodiment 83 is a method as described in enumerated example embodiment 80, wherein the loudness value is computed on the absolute, relative and/or un-gated portions of the media data.

Enumerated example embodiment 84 is a method as described in enumerated example embodiment 80, wherein the consistent dynamic range value comprises a dynamic range value of (1) controlled or selected by a user or (2) adaptively signaled by a state in the input version of the media data.

Enumerated example embodiment 85 is a method as described in enumerated example embodiment 84, wherein the dynamic range value is computed on the dialogue (speech) portions of the media data.

Enumerated example embodiment 86 is a method as described in enumerated example embodiment 84, wherein the dynamic range value is computed on absolute, relative and/or un-gated portions of the media data.

Enumerated example embodiment 87 is a method as described in enumerated example embodiment 80, further comprising: computing one or more loudness and/or dynamic range gain control values for normalizing the output version of the media data to a consistent loudness value and consistent dynamic range; simultaneously carrying the one or more loudness and/or dynamic range gain control values within a state of the output version of the media data at the end of the media processing chain, wherein the one or more loudness and/or dynamic range gain control values are usable by another device to reversely applying the one or more loudness and/or dynamic range gain control values to recover an original loudness value and an original dynamic range in the input version of the media data.

Enumerated example embodiment 88 is a method as described in enumerated example embodiment 87, wherein the one or more one or more loudness and/or dynamic range control values representing the state of the output version of the media data are carried in at least one of a sub-stream, one or more reserved fields, an add_bsi field, one or more auxiliary data fields, or one or more transform coefficients.

Enumerated example embodiment 89 is a method as described in enumerated example embodiment 80, further comprising computing and transmitting, by at least one of the one or more computing devices in the media processing chain, a cryptographic hash value based on the media data and/or the state of the media data within one or more encoded bitstreams that carry the media data.

Enumerated example embodiment 90 is a method as described in enumerated example embodiment 89, further comprising: authenticating, by a recipient device, the cryptographic hash value; signaling, by the recipient device to one or more downstream media processing units, a determination of whether the state of the media data is valid; signaling, by the recipient device to the one or more downstream media processing units, the state of the media data in response to determining that the state of the media data is valid.

Enumerated example embodiment 91 is a method as described in enumerated example embodiment 89, wherein the cryptographic hash value representing the state of the media and/or the media data is carried in at least one of a sub-stream, one or more reserved fields, an add_bsi field, one or more auxiliary data fields, or one or more transform coefficients.

Enumerated example embodiment 92 is a method as described in enumerated example embodiment 80, wherein the state of the media data comprises one or more of: (a) media fingerprints, (b) processing state metadata, (c) extracted media feature values, (d) media class types or sub-type description(s) and/or values (e) media feature class and/or sub-class probability values, (f) cryptographic hash value or (f) media processing signaling.

Enumerated example embodiment 93 is a method comprising performing one of inserting, extracting or editing of related and un-related media data locations and/or a state of related and un-related media data locations within one or more encoded bitstreams by one or more computing devices in a media processing chain comprising one or more of psychoacoustic units, transforms, waveform/spatial audio coding units, encoders, decoders, transcoders, or stream processors.

Enumerated example embodiment 94 is a method as described in enumerated example embodiment 93, wherein the one or more related and un-related media data locations and/or the state of related and un-related media data locations within encoded bitstreams are carried in at least one of a sub-stream, one or more reserved fields, an add_bsi field, one or more auxiliary data fields, or one or more transform coefficients.

Enumerated example embodiment 95 is a method comprising performing one or more of inserting, extracting or editing of related and un-related media data and/or a state of related and un-related media data within one or more encoded bitstreams by one or more computing devices in a media processing chain comprising one or more of psychoacoustic units, transforms, waveform/spatial audio coding units, encoders, decoders, transcoders, or stream processors.

Enumerated example embodiment 96 is a method as described in enumerated example embodiment 95, wherein the one or more related and un-related media data and/or the state of related and un-related media data within encoded bitstreams are carried in at least one of a sub-stream, one or more reserved fields, an add_bsi field, one or more auxiliary data fields, or one or more transform coefficients.

Enumerated example embodiment 97 is a method as described in enumerated example embodiment 93, further comprising providing, from an upstream media processing device to a downstream media processing device, a state of the media data as one or more of: (a) media fingerprints, (b) processing state metadata, (c) extracted media feature values, (d) media class types or sub-type description(s) and/or values (e) media feature class and/or sub-class probability values, (f) cryptographic hash value or (f) media processing signaling.

Enumerated example embodiment 98 is a media processing system configured to compute and carry cryptographic hash values based on media data and/or a state of the media data within one or more encoded bitstreams by one or more computing devices in a media processing chain comprising one or more of psychoacoustic units, transforms, waveform/spatial audio coding units, encoders, decoders, transcoders, or stream processors.

Enumerated example embodiment 99 is a media processing system as described in enumerated example embodiment 98, wherein the state of the media data comprises one or more of: (a) media fingerprints, (b) processing state metadata, (c) extracted media feature values, (d) media class types or sub-type description(s) and/or values (e) media feature class and/or sub-class probability values, (f) cryptographic hash value or (f) media processing signaling.

Enumerated example embodiment 100 is a media processing system configured to adaptively processing media data based on a state of the media data received from one or more secure communication channels.

Enumerated example embodiment 101 is a media processing system as described in enumerated example embodiment 100, wherein the media processing system comprises one or more of processing nodes, and wherein the processing nodes comprise media delivery systems, media distribution systems, and media rendering systems.

Enumerated example embodiment 102 is a media processing system as described in enumerated example embodiment 101, wherein the one or more secure communication channels comprise at least one secure communication channel across two or more of compressed/coded bitstreams and PCM processing nodes.

Enumerated example embodiment 103 is a media processing system as described in enumerated example embodiment 101, wherein the one or more secure communication channels comprise at least one secure communication channel across two separate media processing devices.

Enumerated example embodiment 104 is a media processing system as described in enumerated example embodiment 101, wherein the one or more secure communication channels comprise at least one secure communication channel across two media processing nodes in a single media processing device.

Enumerated example embodiment 105 is a media processing system as described in enumerated example embodiment 100, wherein the media processing system is configured to perform autonomous media processing operations independent of how media processing systems are ordered in a media processing chain of which the media processing system is a part.

Enumerated example embodiment 106 is a media processing system as described in enumerated example embodiment 100, wherein the state of the media data comprises one or more of: (a) media fingerprints, (b) processing state metadata, (c) extracted media feature values, (d) media class types or sub-type description(s) and/or values (e) media feature class and/or sub-class probability values, (f) cryptographic hash value or (f) media processing signaling.

Enumerated example embodiment 107 is a media processing system configured to perform any one of the methods as described in enumerated example embodiments 1-99.

Enumerated example embodiment 108 is an apparatus comprising a processor and configured to perform any one of the methods as described in enumerated example embodiments 1-99.

Enumerated example embodiment 107 is a computer readable storage medium comprising software instructions, which when executed by one or more processors cause performance of any one of the methods as described in enumerated example embodiments 1-99.

9. EQUIVALENTS, EXTENSIONS, ALTERNATIVES AND MISCELLANEOUS

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An audio decoding method, comprising:

receiving an encoded bitstream, the encoded bitstream including:

HE AAC version 1 or HE AAC version 2 encoded input audio data; and metadata indicating a loudness value of dialog portions of the input audio data;

decoding, using an HE AAC version 1 or HE AAC version 2 decoder, the HE AAC version 1 or HE AAC version 2 encoded input audio data to provide decoded audio data;

receiving a flag indicating whether or not to perform loudness normalization processing on the decoded audio data;

when the flag indicates to perform loudness normalization processing on the decoded audio data:

obtaining a user-controlled target loudness value;

extracting, from the metadata, the loudness value of dialog portions of the input audio data;

determining a loudness normalization adjustment value based on the user-controlled target loudness value and the loudness value of dialog portions of the input audio data; and applying the loudness normalization adjustment value to the decoded audio data to provide loudness normalized output audio data; and when the flag indicates not to perform loudness normalization processing on the decoded audio data:

disabling the loudness normalization processing and passing through the decoded audio data unchanged.

2. An audio decoding system comprising one or more signal processing components configured to:

receive an encoded bitstream, the encoded bitstream including:

HE AAC version 1 or HE AAC version 2 encoded input audio data; and metadata indicating a loudness value of dialog portions of the input audio data;

decode, using an HE AAC version 1 or HE AAC version 2 decoder, the HE AAC version 1 or HE AAC version 2 encoded input audio data to provide decoded audio data;

receive a flag indicating whether or not to perform loudness normalization processing on the decoded audio data;

when the flag indicates to perform loudness normalization processing on the decoded audio data:

obtain a user-controlled target loudness value;

extract, from the metadata, the loudness value of dialog portions of the input audio data;

determine a loudness normalization adjustment value based on the user-controlled target loudness value and the loudness value of dialog portions of the input audio data; and apply the loudness normalization adjustment value to the decoded audio data to provide output audio data; and when the flag indicates not to perform loudness normalization processing on the decoded audio data:

disable the loudness normalization processing and pass through the decoded audio data unchanged.

3. A non-transitory computer-readable storage medium comprising a sequence of instructions which, when executed by one or more signal processing components, cause the one or more signal processing components to perform the method of claim 1.

* * * * *